United States Patent [19]

Araki et al.

[11] Patent Number: 5,717,077
[45] Date of Patent: Feb. 10, 1998

[54] FIBER REACTIVE PHTHALOCYANINE MONOAZO COMPOUNDS HAVING IMPROVED DYEING PROPERTIES

[75] Inventors: Toshiyuki Araki, Osaka; Takemi Tokieda, Nara; Shin-ichi Yabushita, Osaka; Yasuyoshi Ueda, Osaka; Bunzi Tsukise, Hyogo, all of Japan

[73] Assignee: Sumitomo Chemical Company, Limited, Osaka, Japan

[21] Appl. No.: 570,415

[22] Filed: Dec. 11, 1995

[30] Foreign Application Priority Data

Dec. 14, 1994 [JP] Japan .................. 6-310885
Dec. 26, 1994 [JP] Japan .................. 6-322842
May 16, 1995 [JP] Japan .................. 7-117047

[51] Int. Cl.$^6$ .................. C09B 47/24; C09B 62/085
[52] U.S. Cl. .................. 534/628; 534/618; 534/622; 534/624; 534/642
[58] Field of Search .................. 534/628, 618, 534/622, 624

[56] References Cited

U.S. PATENT DOCUMENTS

| | | | |
|---|---|---|---|
| 3,132,129 | 5/1964 | Dortmann et al. | 534/628 X |
| 3,445,449 | 5/1969 | Meininger et al. | 534/628 X |
| 3,489,741 | 1/1970 | Grimmel | 534/705 |
| 4,649,193 | 3/1987 | Meininger et al. | 534/622 |
| 5,455,334 | 10/1995 | Wald | 534/624 |

FOREIGN PATENT DOCUMENTS

| | | | |
|---|---|---|---|
| 0036522 | 9/1981 | European Pat. Off. | 534/705 |
| 0471456A | 2/1992 | European Pat. Off. | 534/708 |
| 0611259 | 8/1994 | European Pat. Off. | 534/705 |
| 2115276A | 4/1990 | Japan | 534/705 |
| 408252 | 9/1966 | Switzerland | 534/705 |
| 1114427 | 5/1968 | United Kingdom | 534/705 |
| 2200364 | 8/1988 | United Kingdom | 534/628 |

*Primary Examiner*—Floyd D. Higel
*Attorney, Agent, or Firm*—Watson Cole Stevens Davis, P.L.L.C.

[57] ABSTRACT

A phthalocyanine monoazo compound which is represented by the following formula (I):

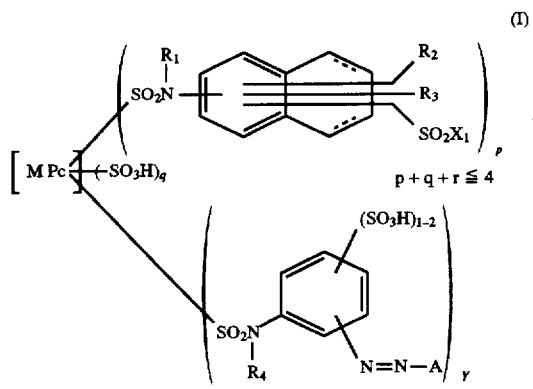

wherein Pc represents a phthalocyanine group; M represents nickel, cobalt or copper;

$R_1$ represents a hydrogen atom or a lower alkyl group;

$R_2$ and $R_3$ represent a hydrogen atom, a lower alkyl group, a lower alkoxy group or a sulfo group;

$R_4$ represents a hydrogen or a lower alkyl group;

A represents a group containing a triazine group or a pyrazole group and/or —SO$_2$X wherein X represents —CH=CH$_2$ or —CH$_2$CH$_2$Y and Y represents a group splittable by the action of an alkali;

p is a number of 0–2; q is a number of 1–3; r is a number of 1–2; p+q+r is 4 or less
or which is a salt of the compound of formula (I).

3 Claims, No Drawings

FIBER REACTIVE PHTHALOCYANINE MONOAZO COMPOUNDS HAVING IMPROVED DYEING PROPERTIES

The present invention relates to a fiber-reactive phthalocyanine monoazo compound and a process for producing the same. The compounds are suitable as a fiber-reactive green dye used in a conventional dyeing or printing process for materials having a hydroxy group and/or nitrogen atom, particularly for cellulose fiber, natural or synthesis polyamide fiber, polyurethane fiber, leather or the like or a mixed fiber thereof.

Phthalocyanine monoazo compounds usable for dyeing fiber materials in green color are described in JP-A-1-221460, JP-A-2-115276, JP-A-4-261470, etc.

Hitherto, various kinds of reactive dyes for dyeing fiber materials in green color have been widely used in the field of dyeing or printing fiber-materials. However, the present technical level is not satisfactory to satisfy the high demand level in properties required for a specific dyeing method or to satisfy the trend of these days toward higher demand in fastness of dyed materials. The known reactive dyes mentioned above are not satisfactory in dyeing properties such as temperature sensitivity, salt sensitivity, alkaline. sensitivity, liquor ratio dependency and build-up property. Hence, more improved dyes have been strongly demanded. Particularly, superior build-up property has become very important these days, because demand level in economy of dyeing methods has been getting higher and higher.

So far, when dyeing a fiber material in green color is conducted with a mixed dye of a phthalocyanine type blue dye such as Reactive Blue 21, and a yellow dye, it is often difficult to dye fiber materials evenly with good reproducibility, due to the differences between the blue dye and the yellow dye in affinity and diffusion property, etc. Hence, it is strongly demanded to solve the problems in dyeing properties of the conventional dyeing method such as uneven dyeing.

The present inventors have conducted extensive studies to solve the problems of the conventional dye such as the difference in affinity and diffusion property and to develop a novel compound usable for dyeing fiber materials in green color which is satisfactory in evenness of dyeing, dyeing reproducibility, build-up property, fastness and other widely demanded properties as dyes. As a result, it was found that a specific kind of phthalocyanine monoazo compound has excellent properties and the present invention was accomplished.

Thus, present invention provides a phthalocyanine monoazo compound (hereinafter referred to as Compound I) which is represented by the following general formula (I):

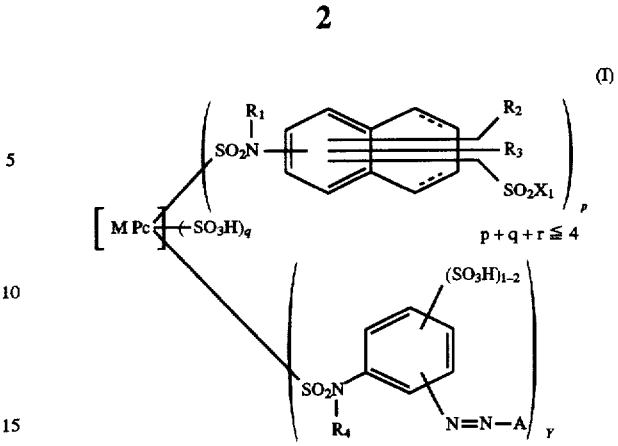

wherein Pc represents a phthalocyanine group; M represents nickel, cobalt or copper; $R_1$ represents a hydrogen atom or an unsubstituted or substituted lower alkyl group;

$R_2$ and $R_3$ are the same or different and represent a hydrogen atom, an unsubstituted or substituted lower alkyl group, a lower alkoxy group or a sulfo group;

$R_4$ represents a hydrogen atom, or an unsubstituted or substituted lower alkyl group;

A represents —B—C in which B is a group represented by the following formula:

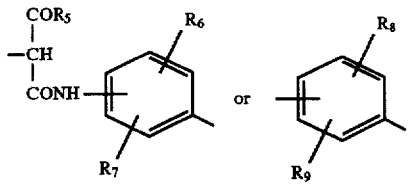

in which $R_5$ represents an unsubstituted or substituted lower alkyl group, $R_6$ and $R_7$ are the same or different and represent a hydrogen atom, an unsubstituted or substituted lower alkyl group, a lower alkoxy group or a sulfo group, and $R_8$ and $R_9$ are the same or different and represent a hydrogen atom, a lower alkoxy group, a sulfo group, a lower alkylsulfonyl amino group, hydroxyacetyl amino group, an unsubstituted or substituted lower alkyl group or a group —NHCOR in which R represents a lower alkyl group, a lower alkoxy group, a phenyl group or a group —NR'R" in which R' and R" are the same or different and represent a hydrogen atom, an unsubstituted or substituted lower alkyl group, and C is a group represented by the following group:

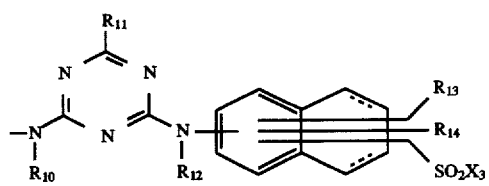

wherein $R_{10}$ and $R_{12}$ are the same or different and represent a hydrogen atom or an unsubstituted or substituted lower alkyl group, $R_{11}$ represents a chlorine atom, a fluorine atom, a bromine atom, a lower alkoxy group, an unsubstituted or substituted lower alkylamino group, a saturated nitrogen-containing heterocyclic group attached to the triazine nucleus via nitrogen or a phenylamino group which is unsubstituted or substituted by 1–3 groups or atoms selected from an unsubstituted or substituted lower alkyl group, a lower alkoxy group, a chlorine atom, a fluorine atom, a bromine atom, —COOH, —SO$_3$H or —SO$_2$X$_2$ group on the phenyl ring and in which the nitrogen atom of the amino group may be substituted by a substituted or unsubstituted lower alkyl group;

$R_{13}$ and $R_{14}$ are the same or different and represent a hydrogen atom, an unsubstituted or substituted lower alkyl group, a lower alkoxy group or a sulfo group;

or A is a group represented by the following formula:

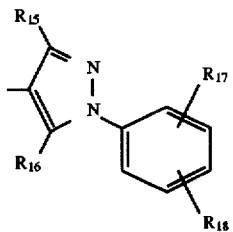

in which $R_{15}$ represents a hydrogen atom, a lower alkyl group, a carboxyl group or a lower alkoxycarbonyl group, $R_{16}$ represents a hydroxy group or a group —NH$_2$ $R_{17}$ and $R_{18}$ are the same or different and represent a hydrogen atom, a lower alkoxy group, a sulfo group, a fluorine group, a chlorine atom, a bromine atom, an acetylamino group, a propionylamino group, a carboxyl group, a group —SO$_2$X$_4$ or an unsubstituted or substituted lower alkyl group;

$X_1$, $X_2$, $X_3$ and $X_4$ are the same or different and represent —CH=CH$_2$ or —CH$_2$CH$_2$Y in which Y represents a group removable by the action of an alkali;

p is from 0 to 2; q is from 1 to 3; r is from 0.5 to 2; and p+q+r is 4 or less;

provided that when p is 0, $R_{11}$ is a chlorine atom, a fluorine atom, a bromine atom or a phenylamino group substituted by at least one group SO$_2$X$_2$;

or a salt thereof;

or a mixture thereof;

and a method of dyeing or printing of a hydroxy- or nitrogen-containing organic material using the said compound or a mixture thereof. In the formula (I),

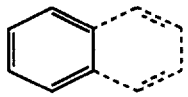

represents a phenyl group or a naphthyl group.

In the present invention, the term "lower" means that it has about 4 or less carbon atoms, and the alkyl group means the one of straight or branched chain unless otherwise mentioned. When alkyl groups are substituted, they preferably have one or two substituents, more preferably one substituent. In the present invention, as groups which can be a substituent in the substituted lower alkyl group, a hydroxy group, a cyano group, an alkoxy group, a halogen atom, a carboxy group, a carbamoyl group, an alkoxycarbonyl group, an alkylcarbonyloxy group, a sulfo group and a sulfamoyl group is preferable. Examples of the lower alkyl group which may be substituted in the formula (I) include a methyl group, an ethyl group, a n-propyl group, an isopropyl group, a n-butyl group, an isobutyl group, a sec-butyl group, a 2-hydroxyethyl group, a 2-hydroxypropyl group, a 3-hydroxypropyl group, a 2-hydroxybutyl group, a 3-hydroxybutyl group, a 4-hydroxybutyl group, a 2,3-dihydroxypropyl group, a 3,4-dihydroxybutyl group, a cyanomethyl group, a 2-cyanoethyl group, a 3-cyanopropyl group, a methoxymethyl group, an ethoxymethyl group, a 2-methoxyethyl group, a 2-ethoxyethyl group, a 3-methoxypropyl group, a 3-ethoxypropyl group, a 2-hydroxy-3-methoxypropyl group, a chloromethyl group, a bromomethyl group, a 2-chloroethyl group, a 2-bromoethyl group, a 3-chloropropyl group, a 2-bromopropyl group, a 4-chlorobutyl group, a 4-bromobutyl group, a carboxymethyl group, a 2-carboxyethyl group, a 3-carboxypropyl group, a 4-carboxybutyl group, a 1,2-dicarboxyethyl group, a carbamoylmethyl group, a 2-carbamoylethyl group, a 3-carbamoylpropyl group, a 4-carbamoylbutyl group, a methoxycarbonylmethyl group, an ethoxycarbonylmethyl group, a 2-methoxycarbonylethyl group, a 2-ethoxycarbonylethyl group, a 3-methoxycarbonylpropyl group, a 3-ethoxycarbonylpropyl group, a 4-methoxycarbonylbutyl group, a 4-ethoxycarbonylbutyl group, a methylcarbonyloxymethyl group, an ethylcarbonyloxymethyl group, a 2-methylcarbonyloxyethyl group, a 2-ethylcarbonyloxyethyl group, a 3-methylcarbonyloxypropyl group, a 3-ethylcarbonyloxypropyl group, a 4-methylcarbonyloxybutyl group, a 4-ethylcarbonyloxybutyl group, a sulfomethyl group, a 2-sulfoethyl group, a 3-sulfopropyl group, a 4-sulfobutyl group, a sulfamoylmethyl group, a 2-sulfamoylethyl group, a 3-sulfamoylpropyl group and a 4-sulfamoylbutyl group.

In the present invention, examples of the lower alkylamino group which may be substituted include a methylamino group, an ethylamino group, an isopropylamino group, a n-propylamino group, a n-butylamino group, a sec-butylamino group and a isobutylamino group each of which may be substituted by a lower alkoxy group, a carboxy group, a sulfo group or a lower alkoxycarbonyl group, and the like.

In the present invention, as the saturated nitrogen-containing heterocyclic group, that containing 5 or 6 atoms in the ring and optionally containing an additional hetero atom selected from oxygen and nitrogen is preferable. Examples of the saturated nitrogen-containing heterocyclic group include a morpholino group, a piperidino group and a piperazino group.

In the present invention, examples of the group removable by the action of an alkali represented by "Y" include a sulfate group, a thiosulfate group, a phosphate group, a group OCOCH$_3$, a chloro group, a fluoro group and a bromo group, among which the sulfate group and the chloro group are preferred.

Nickel and copper are preferred as M in the formula (I) and a hydrogen atom, a methyl group and an ethyl group are preferred as $R_1$ in the formula (I).

Preferably p in the formula (I) is not 0.

A hydrogen atom and a sulfo group are preferred as $R_2$ or $R_3$ in the formula (I). As examples of the group represented by the following formula in the formula (I):

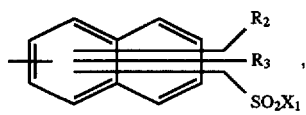

following can be mentioned:

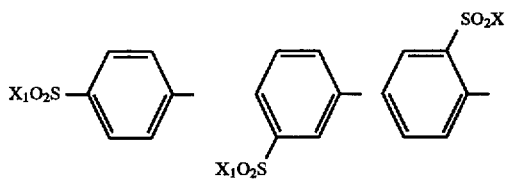

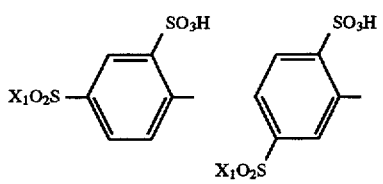

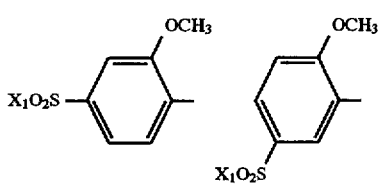

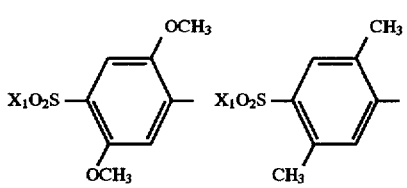

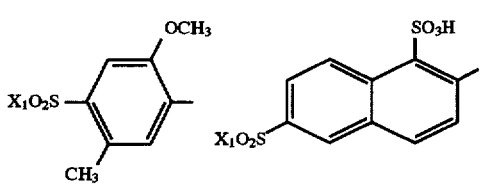

wherein $X_1$ has the same meaning as defined above.

A hydrogen atom, a methyl group and an ethyl group are preferred as $R_4$, $R_{10}$ or $R_{12}$ in the formula (I).

As $R_5$ in the formula (I), a methyl group and an ethyl group are preferred, and a methyl group is particularly preferred.

As $R_6$ or $R_7$ in the formula (I), a methyl group, an ethyl group, a methoxy group and sulfo group are preferred, and a methoxy group and a sulfo group are more preferred. The position on which the monoazo residue is located in the phenylene group substituted by $R_8$ and $R_9$ is preferably 3- or 4- position against —$NR_{10}$ and more preferably 4- position.

As $R_8$ or $R_9$ in the formula (I), a methyl group, an ethyl group, a hydrogen atom or a group —NHCOR are preferred, and a hydrogen atom or a group —NHCOR are more preferred. As R, a methyl group and an ethyl group are preferred, and a methyl group is more preferred.

Among the halogen atoms as $R_{11}$ in the formula (I), a fluorine atom and a chlorine atom are preferred.

As examples of the phenylamino group of $R_{11}$ in the formula (I), following can be mentioned:

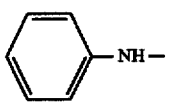

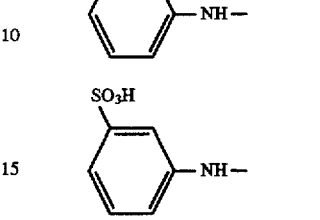

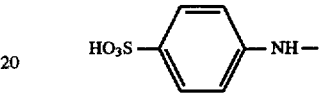

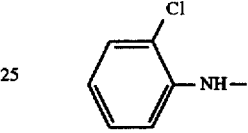

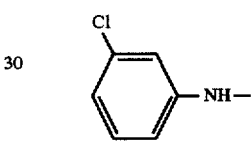

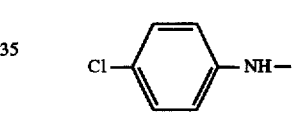

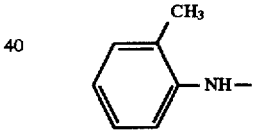

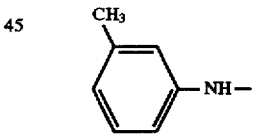

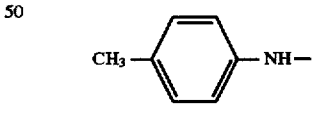

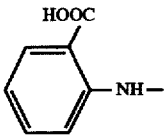

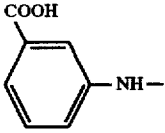

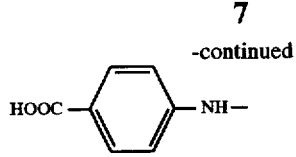
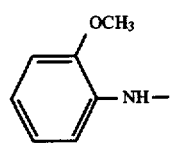
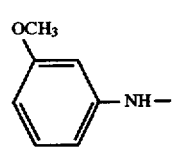
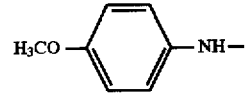
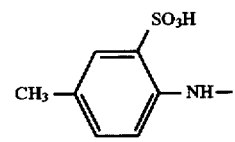
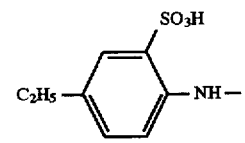
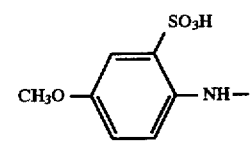
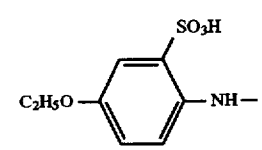
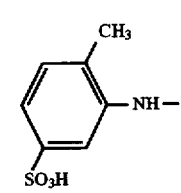
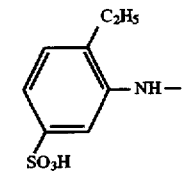
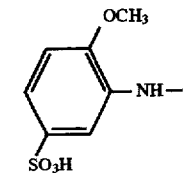
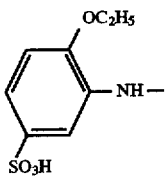
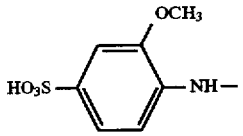
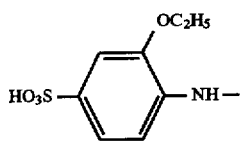
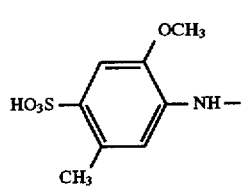
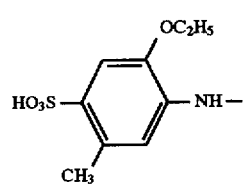
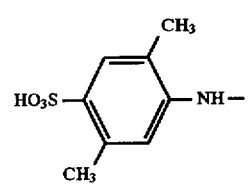
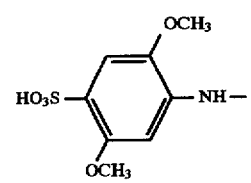
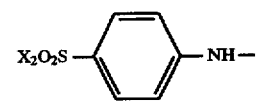
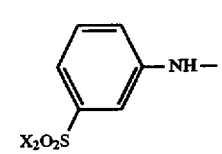
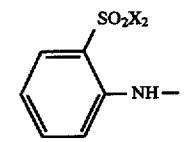

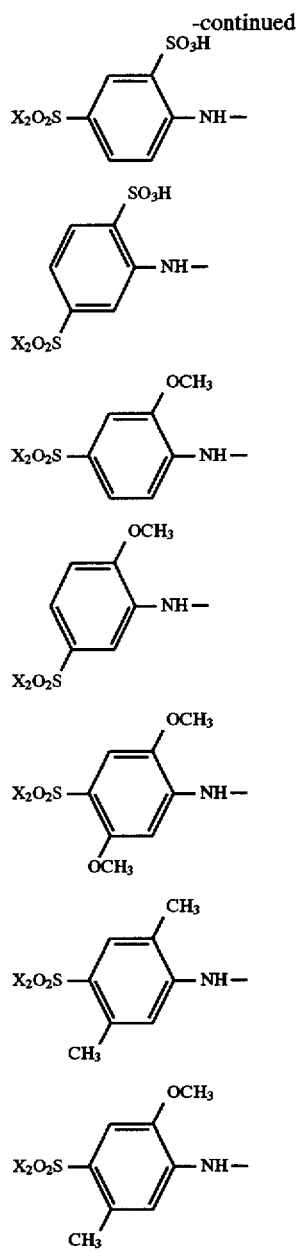

wherein $X_2$ has the same meaning as defined above.

As examples of the saturated nitrogen-containing heterocyclic groups attached to the triazine nucleus via nitrogen, those containing 5 or 6 atoms in the ring and optionally containing an additional hetero atom selected from nitrogen and oxgen are preferable.

Among the lower alkyl group represented by $R_{13}$, $R_{14}$ or $R_{15}$ in the formula (I), a methyl group and an ethyl group are preferred. As examples of the group represented by the following formula in C in the formula (I),:

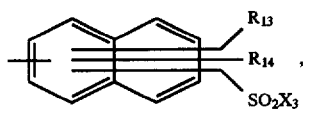

following can be mentioned:

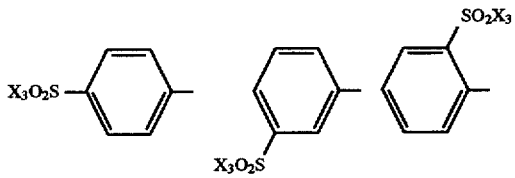
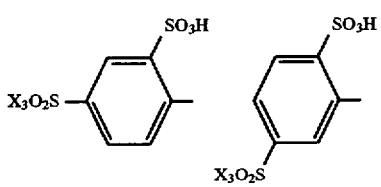
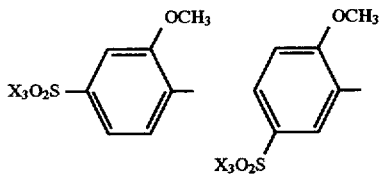
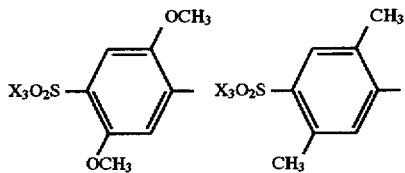
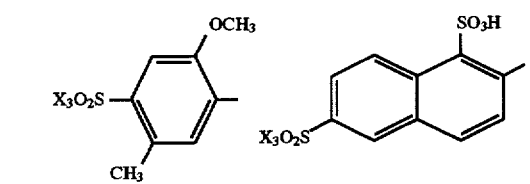

wherein $X_3$ has the same meaning as defined above.

As $R_{17}$ and $R_{18}$ in the formula (I), $-SO_2X_4$ is preferred.

Examples of the phenylene substituted by $R_{17}$ and $R_{18}$ include:

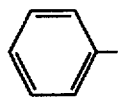
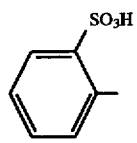
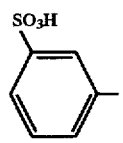
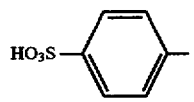

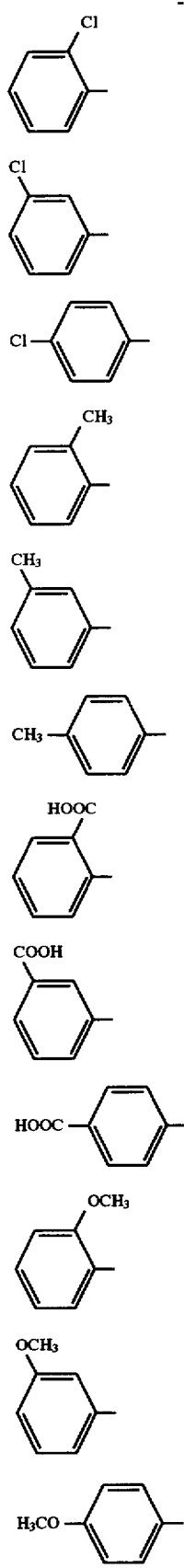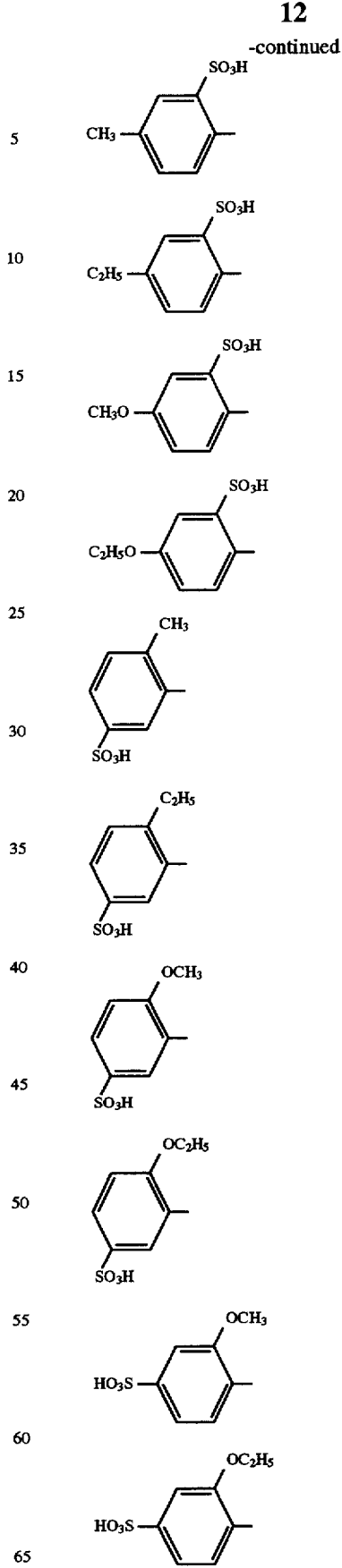

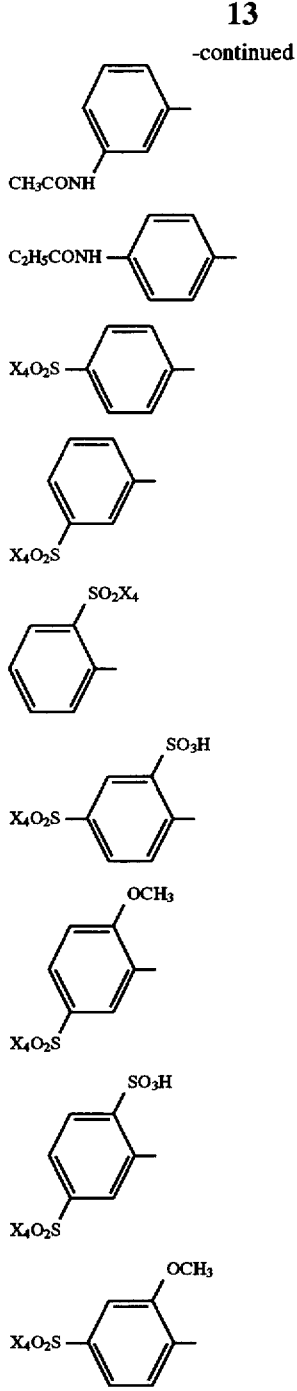

wherein $X_4$ has the same meaning as defined above.

In the present invention, when Compound I is in the form of a salt, kind of the cation accompanied by the sulfo group or by the carboxy group, if any, is not limited. The cation may be any one of non-chromophoric cations usual in the field of fiber-reacting dyes, in so far as the corresponding salt is water soluble. Examples of such cations include alkali metal cations such as a lithium, sodium and potassium cation, an unsubstituted ammonium cation and substituted ammonium cations such as a mono-, di-, tri-, or tetra-methylammonium, triethylammonium and mono-, di- or tri-ethanolammonium cation.

The cations attached to the sulfo groups and those attached to the carboxy group, if any, may be the same or different and may be a mixture of cations such as the above listed cations. That is, Compound I may be in the form of a mixed salt.

Compound I can be produced, for example, by the following process.

When A in the formula (I) is —B—C, this process comprises condensing, in any optional order;

(1) a reaction product which is obtained by diazotizing a phthalocyanine compound represented by the following formula (II):

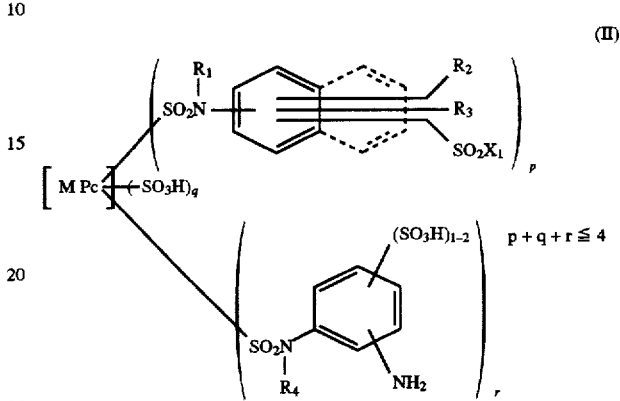

wherein Pc, M, $R_1$, $R_2$, $R_3$, $R_4$, $X_1$, p, q and r have the same meanings as defined above, followed by coupling the diazotized phthalocyanine compound and an aniline derivative represented by the following formula (III-1):

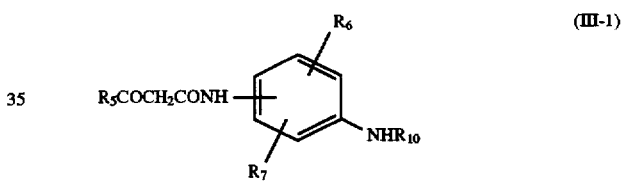

wherein $R_5$, $R_6$, $R_7$ and $R_{10}$ have the same meanings as defined above or an aniline derivative represented by the following formula (III-2):

wherein $R_8$, $R_9$ and $R_{10}$ have the same meanings as defined above (2) a 2,4,6-trihalogeno-s-triazine in which the halogen is fluorine, chlorine or bromine;

(3) an amine represented by the following formula (IV):

wherein $R_{12}$, $R_{13}$, $R_{14}$ and X3 have the same meanings as defined above; and, if necessary, (4) a compound represented by the following formula (V):

wherein $R_{11}'$ represents a lower alkoxy group, an unsubstituted or substituted lower alkylamino group, a saturated nitrogen-containing heterocyclic groups attached to the triazine nucleus via nitrogen or a phenylamino group which is unsubstituted or substituted by 1–3 groups or atoms selected from an unsubstituted or substituted lower alkyl group, a lower alkoxy group, a chlorine atom, a fluorine atom, a bromine atom, —COOH, —SO$_3$H or —SO$_2$X$_2$ group on the phenyl ring and in which the nitrogen atom of the amino group may be substituted by a substituted or unsubstituted lower alkyl group, and X$_2$ has the same meaning as defined above.

Examples of the unsubstituted or substituted lower alkylamino group represented by R$_{11}$' include a methylamino group, an ethylamino group, an isopropylamino group, a n-propylamino group, a n-butylamino group, a sec-butylamino group and an isobutylamino group each of which is unsubstituted or substituted by, for example, a lower alkoxy group, a carboxy group, a sulfo group or a lower alkoxycarbonyl group.

Examples of the saturated nitrogen-containing heterocyclic group represented by R$_{11}$' include a morpholino group, a piperidino group and a piperazino group.

Examples of the unsubstituted or substituted phenylamino group represented by R$_{11}$' include groups listed above as examples of substituted phenylamino groups represented by R$_{11}$.

Examples of the lower alkoxy group represented by R$_{11}$' include a methoxy group, an ethoxy group, an isopropoxy group, a n-propoxy group, a n-butoxy group, a sec-butoxy group and an isobutoxy group.

Compound I wherein A in the formula (I) is —B—C can also be produced by condensing, in any optional order, an aniline derivative of the formula (III-1) or (III-2); 2,4,6-trihalogeno-s-triazine in which the halogen is fluorine, chlorine or bromine;
an amine of the formula (IV);
and, if necessary,
a compound of the formula (V) ps to obtain a triazine compound represented by the following formula (VI-1):

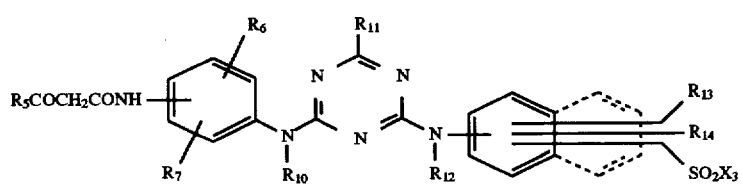

(VI-1)

or a triazine compound represented by the following formula (VI-2):

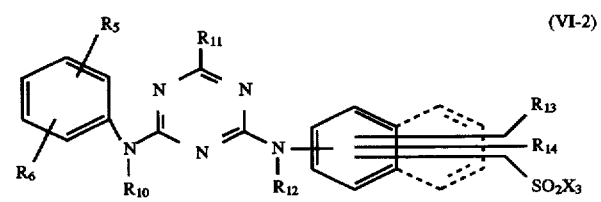

(VI-2)

respectively, wherein R$_5$, R$_6$, R$_7$, R$_8$, R$_9$, R$_{10}$, R$_{11}$, R$_{12}$, R$_{13}$, R$_{14}$ and X$_3$ have the same meaning as defined above; followed by coupling the triazine compound thus obtained and a reaction product obtained by diazotizing a phthalocyanine compound of the formula (II).

In the process mentioned above, the order of the condensation reaction of 2,4,6-trihalogeno-s-triazine with other raw material is not particularly limited. Although the reaction conditions are not limited particularly, usually the condensation reaction of the unsubstituted 2,4,6-trihalogeno-s-triazine is conducted at the reaction temperature in a range of –10° C. to 40° C. and the pH in a range of 2 to 9; the condensation reaction of the monosubstituted 2,4,6-tri halogeno-s-triazine is conducted at the temperature in a range of 0° C. to 70° C. and the pH in a range of 2 to 9; and the condensation reaction of the disubstituted 2,4,6-trihalogeno-s-triazine is conducted at the temperature in a range of 10° C. to 100° C. and the pH in a range of 2 to 7. The condensation reaction of 2,4,6-trihalogeno-s-triazine need not be completed before the diazotization and the coupling reaction are conducted. The condensation reaction of 2,4,6-trihalogeno-s-triazine can be conducted after the diazotization and the coupling reaction.

When A in the formula (I) is a group of the formula:

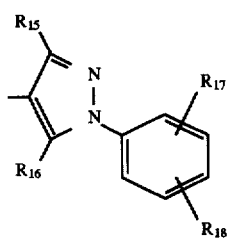

Compound I can be produced, for example, by coupling a diazotized phthalocyanine compound of formula (II) and a pyrazole derivative represented by the following formula (VII):

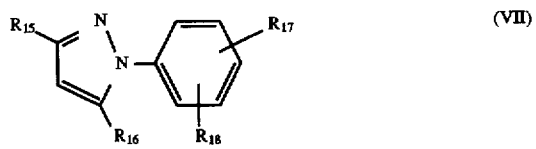

(VII)

wherein R$_{15}$, R$_{16}$, R$_{17}$ and R$_{18}$ have the same meaning as defined above.

The phthalocyanine compound of the formula (II), one of the starting material used in the above mentioned processes, may be a known compound or can be prepared by a known method using known compounds. The phthalocyanine compound can be prepared, for example, by conducting a chlorosufonation of a phthalocyanine compound usual in the phthalocyanine dye field, followed by condensation reactions with a diamine and an amine represented by the following formulae (VIII) and (IX), respectively:

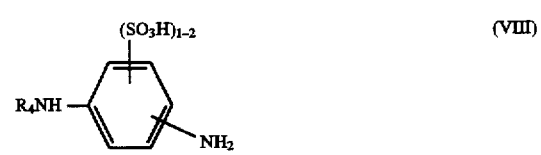

(VIII)

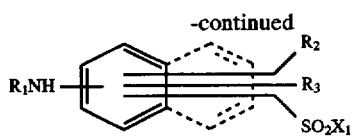

wherein $R_1$, $R_2$, $R_3$, $R_4$ and $X_1$ have the same meanings as defined above. Order of the condensation reaction with (VIII) or (IX) is not particularly limited and the condensation reaction can be conducted with a mixture of (VIII) and (IX).

When $-SO_2X_1$, $-SO_2X_2$, $-SO_2X_3$ or $-SO_2X_4$ in the present invention is $-SO_2CH_2CH_2Y$ and the group removable by the action of an alkali represented by Y is an ester group such as a sulfate group or a phosphate group, the formation of such esters may be carried out after the condensation reaction or the coupling reaction.

For example, Compound I can be obtained by conducting a synthesis according to one of the processes described above using a compound represented by the following formula (X):

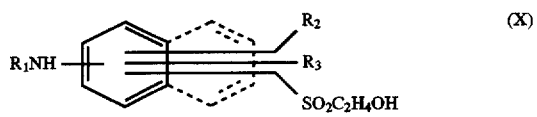

wherein $R_1$, $R_2$ and $R_3$ have the same meaning as defined above, in place of amine of formula (IX);

when A in the formula (I) is $-B-C$, using a compound represented by the following formula (XI)

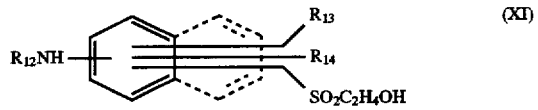

wherein $R_{12}$, $R_{13}$ and $R_{14}$ have the same meaning as defined above, in place of amine of formula (IV); and if $R_{11}'$ has a fiber-reactive group, i.e. $-SO_2X_2$, using a hydrolysate thereof, i.e. a compound represented by the following formula (XII):

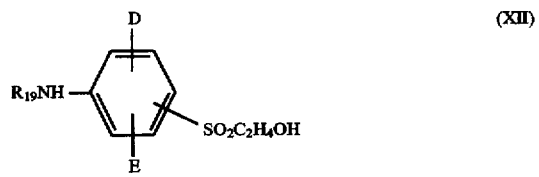

wherein $R_{19}$ represents a hydrogen atom or an unsubstituted or substituted lower alkyl group, and D and E are the same or different and represent a lower alkyl group, a lower alkoxy group, a chlorine atom, a fluorine atom, a bromine atom, $-COOH$, $-SO_3H$, $-SO_2X_2$ or $-SO_2C_2H_4OH$;

when A in the formula (I) is a group of the following formula:

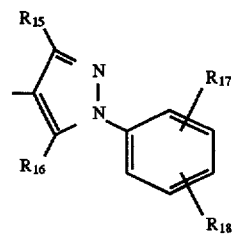

and the phenyl group connected to the pyrazole ring has a reactive group $-SO_2X_4$, using a hydrolysate thereof represented by the following formula (XIII):

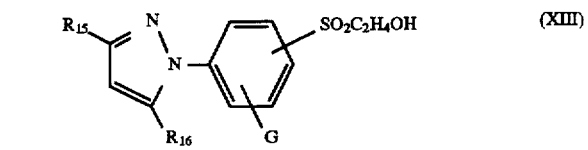

wherein $R_{15}$ and $R_{16}$ have the same meaning as defined above, and G represents a hydrogen atom, an unsubstituted or substituted lower alkyl group, a lower alkoxy group, a chlorine atom, a fluorine atom, a bromine atom, an acetylamino group, a propionyl amino group, a carboxyl group, $-SO_2X_4$ or $-SO_2C_2H_4OH$;

to obtain a compound which is a precursor of the ester compound;

and then converting the compound thus obtained by an esterification to introduce to the compound a group such as a sulfate group or a phosphate group and obtain Compound I. In the method mentioned above, together with the hydrolysates, their corresponding ester may be used.

As 2,4,6-trihalogeno-s-triazine, the starting material, cyanuric chloride and cyanuric fluoride are particularly preferred.

Depending on the conditions of the reaction and isolation, the compound of the invention is obtained in the form of a free acid or in the form of a salt or a mixed salt containing one or more cations such as cations described above. The form of a salt or a mixed salt is preferred. The compound can be converted from the free acid form to a salt form or vice versa or a salt form to another salt form, by conventional means.

Compound I and a mixture thereof are useful as fiber-reactive dyes for dyeing or printing hydroxy- or nitrogen-containing organic substrates. Preferred substrates are fiber materials containing or consisting of leathers, natural or synthetic polyamides and particularly natural cellulose, for example, cotton, viscose and cuprammonium rayon. The most preferred substrate is a fiber material containing cotton or that consisting of cotton. The dyeing or printing is carried out according to a usual known method for the fiber-reactive dyes and considering the physicochemical properties of the fiber materials.

Compound I and a mixture thereof do not give unlevelness which has been a problem when a green dyeing of a substrate containing cotton is conducted using a combination of a phthalocyanine blue and a yellow. In addition, the compounds of the invention have sufficient compatibility with other fiber-reactive dyes and can be applied singly or in combination with other suitable fiber-reactive dyes of yellow, blue or the like having similar dyeing properties, for example, general fastness properties and degree of exhaustion from dye bath to fibers.

Compound I and a mixture thereof have a good build-up properties and give an excellent degree of exhaustion and fixation rates. Any unfixed material can be easily removed by washing from the substrate. Further, they have a good solubility, are less susceptible to variation of the amount of dyeing auxiliaries such as salts, alkali agents and the like and liquor ratio and give a stable dyed product. The obtained dyed products and printed products exhibit extremely good dry and wet color fastness to light. Also, they are excellent in wet color fastness properties, for example, excellent in washing, water, sea-water and perspiration fastness, and have a good color fastness to chlorination and good washing fastness with oxidative substances, for example, chlorinated water, hypochlorite bleaching agent or peroxide. Further, the obtained dyed products are less susceptible to discoloration on fixing treatment or resin finishing.

EXAMPLES

The following Examples are given to further illustrate the present invention. In the Examples, part and % mean part by weight and % by weight.

while keeping the pH at 4.0–4.5 with the aid of aqueous sodium carbonate solution. Thereafter, 31 parts of 1-aminobenzene-3-β-sulfatoethyl sulfone was added thereto, and the resulting reaction mass was stirred for 4 hours at 40°–45° C. while keeping the pH at 5.0–5.5 with the aid of aqueous sodium carbonate solution, and., then, was dried to obtain 250 parts of a phthalocyanine monoazo compound represented by the following formula:

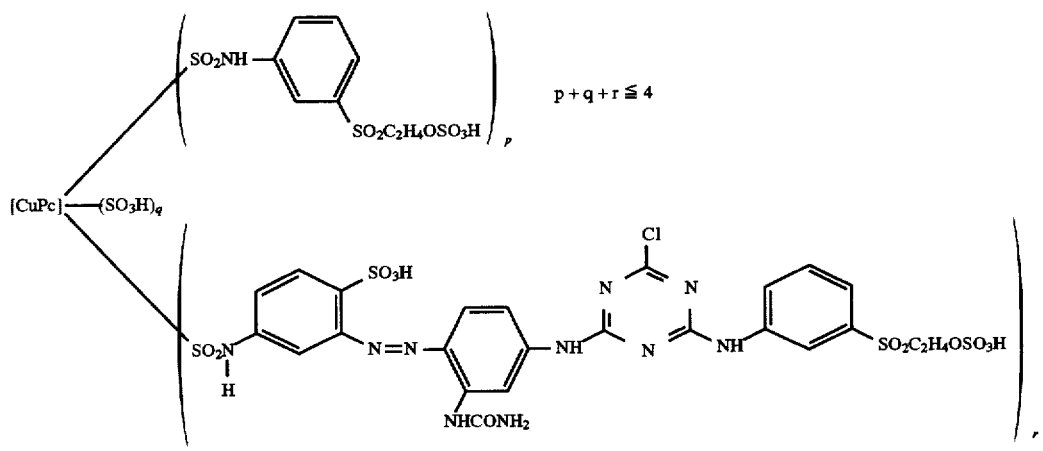

EXAMPLE 1

Into 240 parts of chlorosulfonic acid was charged 57.6 parts of copper phthalocyanine blue with agitation and the mixture was stirred at 120°–130° C. for 3–4 hours. After cooling the mixture to 70° C., 50 parts of thionyl chloride was charged at 70° C. over 3–5 hours. Then, the mixture was gradually heated to 110°–120° C. and kept at the same temperature for 1–2 hours. The obtained reaction mass was discharged into ice-water at 0°–5° C. and filtered to give a wet cake. The wet cake was washed with water and then pasted with cold water to afford about 450 parts of copper phthalocyanine sulfochloride slurry.

Into the above sulfochloride slurry were added a solution of 16 parts of 2,4-diaminobenzenesulfonic acid dissolved in 60 parts of water with the aid of caustic alkali, a solution of 39 parts of 1-aminobenzene-3-β-sulfatoethylsulfone dissolved in 70 parts of water with the aid of sodium carbonate and 1.5 part of pyridine. The mixture was stirred at about 20° C. for 10–15 hours. During this period, about 200 parts of 15% aqueous sodium carbonate solution was used in order to keep pH at 6.0–6.5. About 900 parts of condensate reaction solution was obtained.

To the condensate reaction solution thus obtained, 6.9 parts of sodium nitrite was added, and the resulting solution was added dropwise to a mixture of 21 parts of 35% hydrochloric acid and 200 parts of water at 10°–15° C. to conduct a diazotization. To the diazotized reaction product thus obtained, 15.1 parts of m-ureido aniline was added and, then, pH of the solution was adjusted to 6.0 with the aid of aqueous sodium carbonate solution to obtain green reaction mass. After adding 18.2 parts of cyanuric chloride to the green reaction mass, it was stirred for 2 hours at 10°–15° C.

wherein Pc represents a phthalocyanine group, p=1.0, q=2.2 and r=0.8, and/or a salt thereof.

λmax. ; 674 nm 0.3 Part of the phthalocyanine monoazo compound thus obtained was dissolved in 200 parts of water and 10 parts of sodium sulfonate was added thereto. To the resulting solution, 10 parts of cotton cloth was added and, then, after the temperature was raised to 60° C., it was stirred for 30 minutes. Thereafter, 4 parts of sodium carbonate was added thereto and dyeing was conducted at that temperature for 1 hour. After the completion of the dyeing, washing and soaping were carried out to obtain a green dyed product excellent in various fastness. The phthalocyanine monoazo compound exhibited good dyeing reproducibility.

EXAMPLES 2–23

By conducting the same processes in Example 1 except that 1-aminobenzene-3-β-sulfatoethylsulfone used in the reaction with phthalocyanine is replaced with each of aminobenzene compounds or aminonaphthalene derivatives shown and numbered 2–23 in the following list, the corresponding phthalocyanine monoazo compound can be obtained. By conducting the dyeing by using them, dyed products having green color can be obtained.

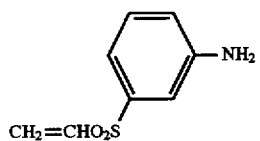

2

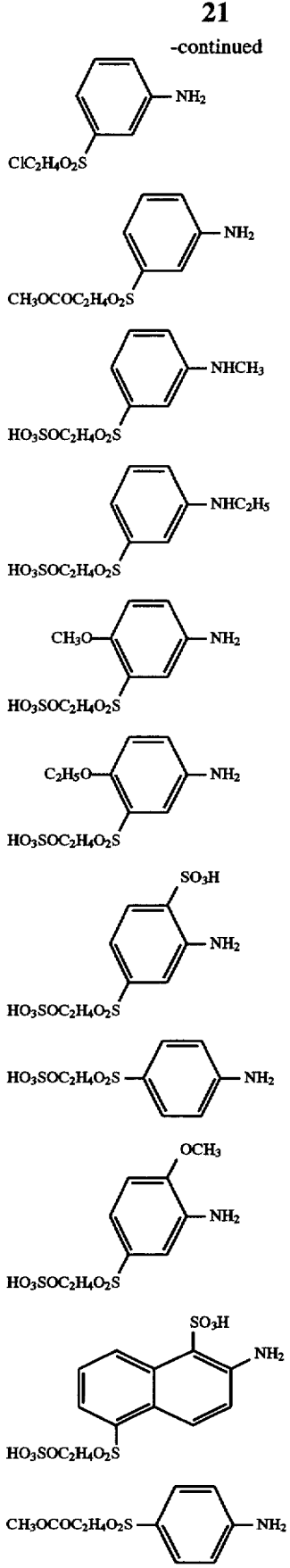
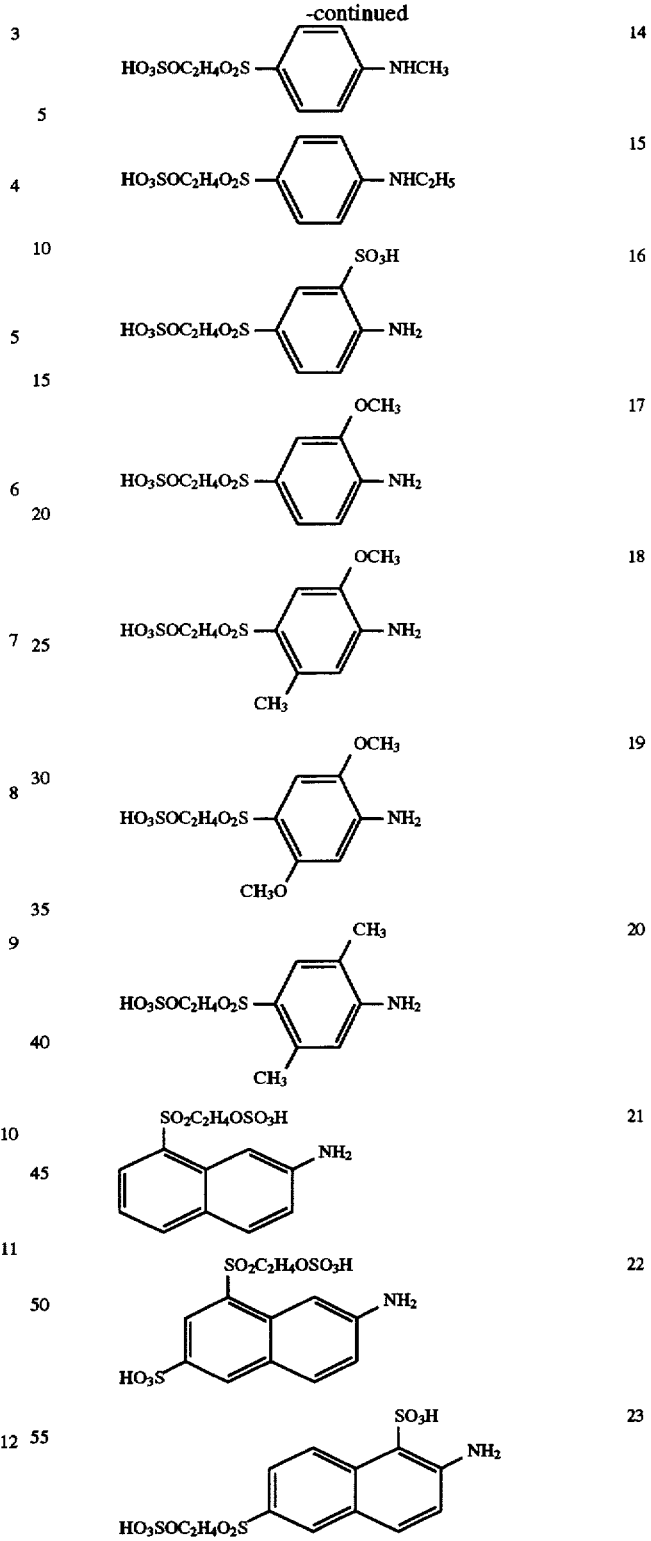

EXAMPLES 24–27

By conducting the same processes in Example 1 except that 2,4-diaminobenzene sulfonic acid used in the reaction with phthalocyanine blue is replaced with each of diaminobenzene derivatives No. 24–27 listed below, the corresponding phthalocyanine monoazo compound can be obtained. By conducting the dyeing by using them, dyed products having green color can be obtained.

24 2,5-diaminobenzene sulfonic acid 25 4,6-diaminobenzene 1,3-disulfonic acid 26 2-amino-4-(N-methylaminobenzene) sulfonic acid 27 2-amino-5-(N-methylaminobenzene) sulfonic acid

EXAMPLES 28–49

By conducting the same processes in Example 1 except that 1-aminobenzene-3-β-sulfatoethylsulfone used in the reaction with cyanuric chloride is replaced with each of aminobenzene compounds or aminonaphthalene derivatives No. 24–49 listed below, the corresponding phthalocyanine monoazo compound can be obtained. By conducting the dyeing by using them, dyed products having green color can be obtained.

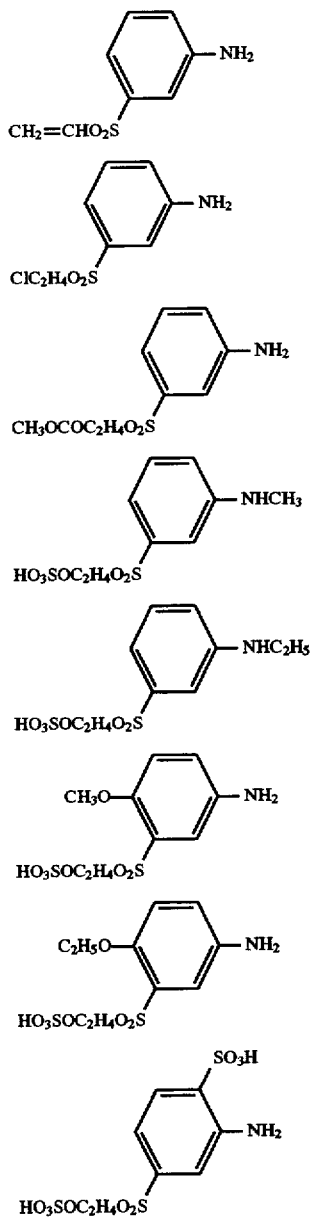

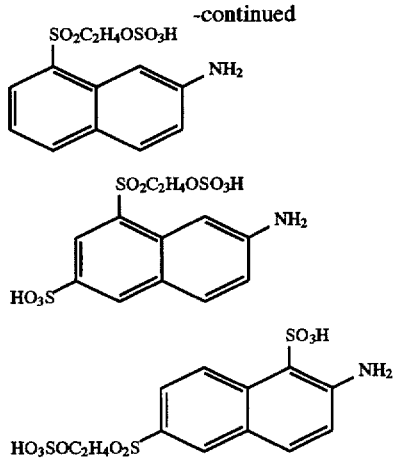

EXAMPLES 50–70

By conducting the same processes in Example 1 except that m-ureido aniline is replaced with each of the compounds shown in the following Table 1, the corresponding phthalocyanine monoazo compound can be obtained. By conducting the dyeing by using them, dyed products having green color can be obtained.

TABLE 1

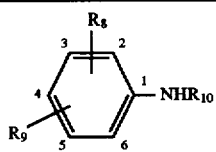

| No. | R₈ | R₉ | R₁₀ |
|---|---|---|---|
| 50 | H | 3-NHCONH₂ | CH₃ |
| 51 | H | 3-NHCONH₂ | C₂H₅ |
| 52 | H | 3-NHCONH₂ | HOOCC₂H₄ |
| 53 | H | 3-CH₃ | H |
| 54 | H | 3-CH₂COOH | H |
| 55 | H | 3-C₂H₅ | H |
| 56 | H | 3-OCH₃ | H |
| 57 | H | 3-SO₃H | H |
| 58 | H | 3-NHSO₂CH₃ | H |
| 59 | 2-CH₃ | 5-CH₃ | H |
| 60 | H | 3-NHCOCH₂OH | H |
| 61 | H | 3-NHCOCH₃ | H |
| 62 | H | 3-NHCOC2H₅ | C₂H₅ |
| 63 | H | 3-NHCOOCH₃ | H |
| 64 | H | 3-NHCONHCH₃ | H |
| 65 | 2-SO₃H | 5-SO₃H | H |
| 66 | H | 3-NHCOC₆H₅ | H |
| 67 | 2-OCH₃ | 5-NHCOC₂H₅ | H |
| 68 | 2-OCH₃ | 5-CH₃ | H |
| 69 | H | 3-NHCOCH₃ | C₂H₅ |
| 70 | H | 3-NHCOCH₃ | CH₃ |

EXAMPLES 71

Example 1 was repeated except that the amount of 2,4-diaminobenzene sulfonic acid used in the reaction with the copper phthalocyanine sulfochloride slurry was increased to 19.2 parts, the amount of 1-aminobenzene-3-β-sulfatoethylsulfone used in the preparation of the condensate reaction solution was decreased to 22.4 parts, and the amounts of sodium nitrite, 35% hydrochloric acid, m-ureido aniline, cyanuric chloride and 1-aminobenzene-3-β-sulfatoethyl sulfone used in the preparation of the phthalocyanine monoazo compound were increased to 8.3 parts, 25.2 parts, 18.1 parts, 22.1 parts and 38.0 parts, respectively, to obtain a compound having the same structure as that in Example 1 except that in the formula, p=0.8, q=2.2 and r=1.0.

0.3 Part of the phthalocyanine monoazo compound thus obtained was dissolved in 200 parts of water and 10 parts of sodium sulfonate was added thereto. To the resulting solution, 10 parts of cotton cloth was added and, then, after the temperature was raised to 60° C., it was stirred for 30 minutes. Thereafter, 4 parts of sodium carbonate was added thereto and dyeing was conducted at that temperature for 1 hour. After the completion of the dyeing, washing and soaping were carried out to obtain a dyed product excellent in various fastness which has green color but is more yellowish than the dyed product in Example 1.

EXAMPLE 72

By conducting the same processes in Example 1 except that cyanuric chloride (=2,4,6-trichloro-s-triazine) used in Example 1 is replaced with 2,4,6-trifluoro-s-triazine or with 2,4,6-tribromo-s-triazine, the corresponding phthalocyanine monoazo compound can be obtained.

EXAMPLE 73

To the final reaction solution obtained in Example 1, 31 parts of 1-aminobenzene-3-β-sulfatoethylsulfone was added and then the reaction was conducted at 65°–70° C. for 7–10 hours, while keeping the pH at 2.0–3.0. Thus, a phthalocyanine monoazo compound represented by the following formula:

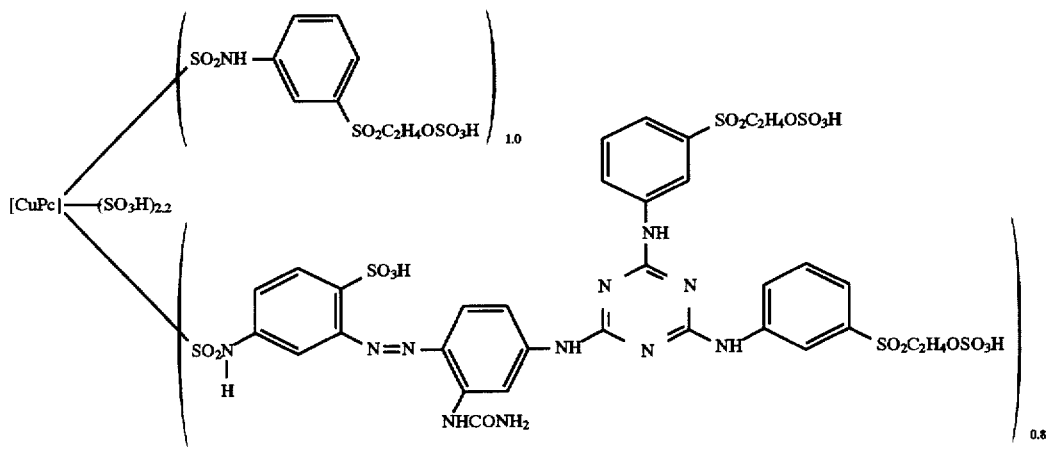

wherein Pc represents phthalocyanine group, and/or salt thereof was obtained.

λmax.: 674 nm 0.3 Part of the monoazo compound thus obtained was dissolved in 200 parts of water. Then 10 parts of sodium sulfate and 10 parts of a cotton cloth was added thereto and the bath temperature was raised to 60° C. After stirring it as it is for 30 minutes, 4 parts of sodium carbonate was added thereto and dyeing was conducted at that temperature for one hour. After completion of the dyeing, washing and soaping were conducted to obtain a green dyed product which is excellent in various fastness and superior in build-up property to that obtained by using the compound described in Example 1.

EXAMPLES 74–123

By conducting the same processes in Example 73 except that 1-aminobenzene-3-β-sulfatoethylsulfone used in Example 73 is replaced with a compound represented by RNHR" wherein the meanings of R and R" are as described in Table 2, the corresponding phthalocyanine monoazo compound can be obtained and green dyed product can be obtained by conducting dyeing by using them.

TABLE 2

| No. | R | R" |
|---|---|---|
| | RNHR" | |
| 74 | $C_6H_5$ | H |
| 75 | $C_6H_4SO_3H$-2 | H |
| 76 | $C_6H_4SO_3H$-3 | H |
| 77 | $C_6H_4SO_3H$-4 | H |
| 78 | $C_6H_4CH_3$-4 | H |
| 79 | $C_6H_4C_2H_5$-2 | H |
| 80 | $C_6H_4C_3H_7$-3 | H |
| 81 | $C_6H_4OCH_3$-4 | H |
| 82 | $C_6H_4OCH_3$-2 | H |
| 83 | $C_6H_4OC_2H_5$-3 | H |
| 84 | $C_6H_3(SO_3H$-2$)CH_3$-4 | H |
| 85 | $C_6H_3(SO_3H$-2$)C_2H_5$-5 | H |
| 86 | $C_6H_3(SO_3H$-2$)OCH_3$-4 | H |
| 87 | $C_6H_3(SO_3H$-2$)OC_2H_5$-5 | H |
| 88 | $C_6H_3(SO_3H$-5$)CH_3$-2 | H |
| 89 | $C_6H_3(SO_3H$-5$)C_2H_5$-2 | H |
| 90 | $C_6H_3(SO_3H$-5$)OCH_3$-2 | H |
| 91 | $C_6H_3(SO_3H$-5$)OC_2H_5$-2 | H |

TABLE 2-continued

| No. | R | R" |
|---|---|---|
| | RNHR" | |
| 92 | $C_6H_3(SO_3H$-4$)OCH_3$-2 | H |
| 93 | $C_6H_3(SO_3H$-4$)OC_2H_5$-2 | H |
| 94 | $C_6H_4COOH$-2 | H |
| 95 | $C_6H_4COOH$-3 | H |
| 96 | $C_6H_4COOH$-4 | H |
| 97 | $C_6H_4Cl$-4 | H |
| 98 | $C_6H_4Cl$-3 | H |
| 99 | $C_6H_4Br$-2 | H |
| 100 | $C_6H_2(SO_3H$-4$)(OCH_3$-2$)CH_3$-5 | H |
| 101 | $C_6H_2(SO_3H$-4$)(OC_2H_5$-2$)CH_3$-5 | H |
| 102 | $C_6H_3(CH_3)_2$-2,5 | H |
| 103 | $C_6H_2(SO_3H$-4$)(CH_3)_2$-2,5 | H |
| 104 | $C_6H_3(OCH_3)_2$-2,5 | H |
| 105 | $C_6H_2(SO_3H$-4$)(OCH_3)_2$-2,5 | H |
| 106 | $C_6H_3(OCH_3$-2$)CH_3$-4 | H |
| 107 | $C_6H_4SO_2CH=CH_2$-3 | H |
| 108 | $C_6H_3(SO_2C_2H_4OSO_3H$-3$)OCH_3$-4 | H |
| 109 | $C_6H_3(SO_2C_2H_4OSO_3H$-3$)SO_3H$-2 | H |
| 110 | $C_6H_4SO_2C_2H_4OSO_3H$-4 | H |
| 111 | $C_6H_4SO_2C_2H_4OCOCH_3$-4 | H |
| 112 | $C_6H_3(SO_2C_2H_4OSO_3H$-4$)SO_3H$-2 | H |
| 113 | $C_6H_3(SO_2C_2H_4OSO_3H$-4$)OCH_3$-2 | H |
| 114 | $C_6H_2(SO_2C_2H_4OSO_3H$-4$)(OCH_3$-2$)CH_3$-5 | H |
| 115 | $C_6H_2(SO_2C_2H_4OSO_3H$-4$)(CH_3)_2$-2,5 | H |
| 116 | $C_6H_2(SO_2C_2H_4OSO_3H$-4$)(OCH_3)_2$-2,5 | H |
| 117 | $C_6H_4SO_2C_2H_4OSO_3H$-3 | $C_2H_5$ |
| 118 | $C_6H_4SO_2C_2H_4Cl$ | $CH_3$ |
| 119 | $C_6H_4SO_2C_2H_4OSO_3H$-4 | $C_2H_5$ |
| 120 | $HOOCCH_2$ | H |
| 121 | $CH_3$ | H |
| 122 | $C_2H_5$ | H |
| 123 | $C_4H_9$ | H |

EXAMPLES 124–126

By conducting the same processes in Example 73 except that 1-aminobenzene-3-β-sulfatoethylsulfone used in Example 73 is replaced with a compound represented by ROH wherein the meanings of R are as described in Table 3, the corresponding phthalocyanine monoazo compound can be obtained and green dyed product can be obtained by conducting dyeing by using them.

TABLE 3

| | ROH |
|---|---|
| No. | R |
| 124 | $CH_3$ |
| 125 | $C_2H_5$ |
| 126 | $C_3H_7$ |

EXAMPLE 127

0.3 Part of each of the monoazo compounds obtained in Example 1, 71 and 73 was dissolved in 200 parts of water. Then 10 parts of sodium sulfate and 10 parts of a cotton cloth was added thereto and the bath temperature was raised to 70°–90° C. After stirring it as it is for 30 minutes, 4 parts of sodium carbonate was added thereto and dyeing was conducted at that temperature for one hour. After completion of the dyeing, washing and soaping were conducted to obtain a green dyed product which is excellent in various fastness and good in build-up property.

EXAMPLE 128

By conducting the same processes in Examples 1–126 except that the copper phthalocyanine blue was replaced with nickel phthalocyanine blue, the corresponding nickel phthalocyanine monoazo compound can be obtained.

EXAMPLE 129

Preparation of the condensate reaction solution in Example 1 was repeated to obtain about 900 parts of condensate reaction solution.

To the condensate reaction solution thus obtained, 6.9 parts of sodium nitrite was added, and the resulting solution was added dropwise to a mixture of 21 parts of 35% hydrochloric acid and 200 parts of water at 10°–15° C. to conduct a diazotization. To the diazotized reaction product thus obtained, 30.2 parts of 2-amino-4-methoxy-5-(3'-oxobutyrylamino) benzene sulfonic acid was added and, then, pH of the solution was adjusted to 6.0 with the aid of aqueous sodium carbonate solution to obtain green reaction mass. After adding 18.4 parts of cyanuric chloride to the green reaction mass, it was stirred for 2 hours at 10°–15° C. while keeping the pH at 4.0–4.5 with the aid of aqueous sodium carbonate solution. Thereafter, 31 parts of 1-aminobenzene-3-β-sulfatoethyl sulfone was added thereto, and the resulting reaction mass was stirred for 4 hours at 40°–45° C. while keeping the pH at 5.0–5.5 with the aid of aqueous sodium carbonate solution, and, then, was dried to obtain 270 parts of a phthalocyanine monoazo compound represented by the following formula:

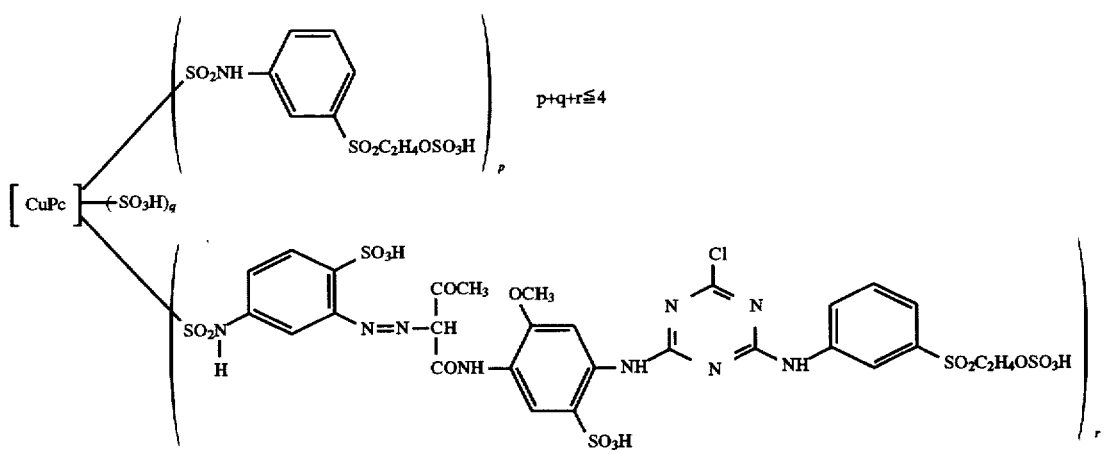

wherein Pc represents phthalocyanine group, p=1.0, q=2.2 and r=0.8, and/or a salt thereof.

λmax. ; 674 nm 0.3 Part of the phthalocyanine monoazo compound thus obtained was dissolved in 200 parts of water and 10 parts of sodium sulfonate was added thereto. To the resulting solution, 10 parts of cotton cloth was added and, then, after the temperature was raised to 60° C., it was stirred for 30 minutes. Thereafter, 4 parts of sodium carbonate was added thereto and dyeing was conducted at that temperature for 1 hour. After the completion of the dyeing, washing and soaping were carried out to obtain a green dyed product excellent in various fastness. The phthalocyanine monoazo compound exhibited good dyeing reproducibility.

EXAMPLES 130–151

By conducting the same processes in Example 129 except that 1-aminobenzene-3-β-sulfatoethylsulfone used in the reaction with phthalocyanine is replaced with each of aminobenzene compounds or aminonaphthalene derivatives shown and numbered 2–23 (The number plus 128 corresponds the Example number.) in the following list, the corresponding phthalocyanine monoazo compound can be obtained. By conducting the dyeing by using them, dyed products having green color can be obtained.

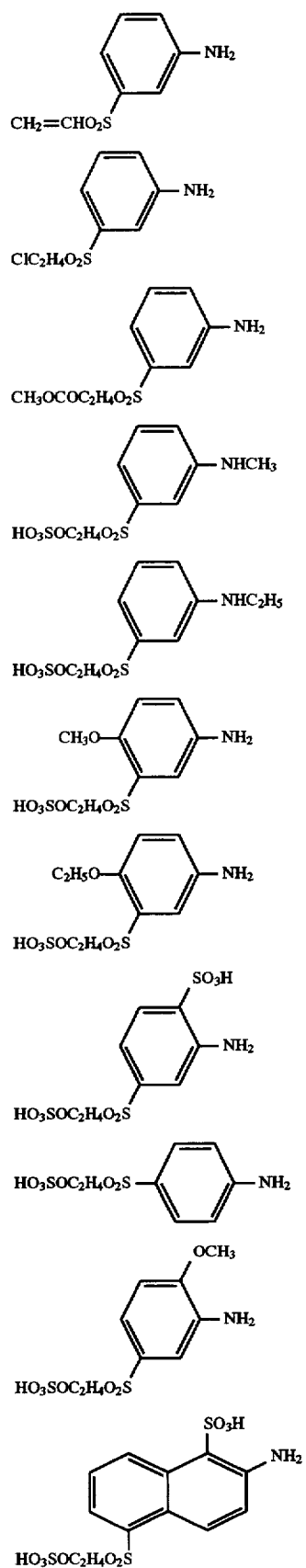
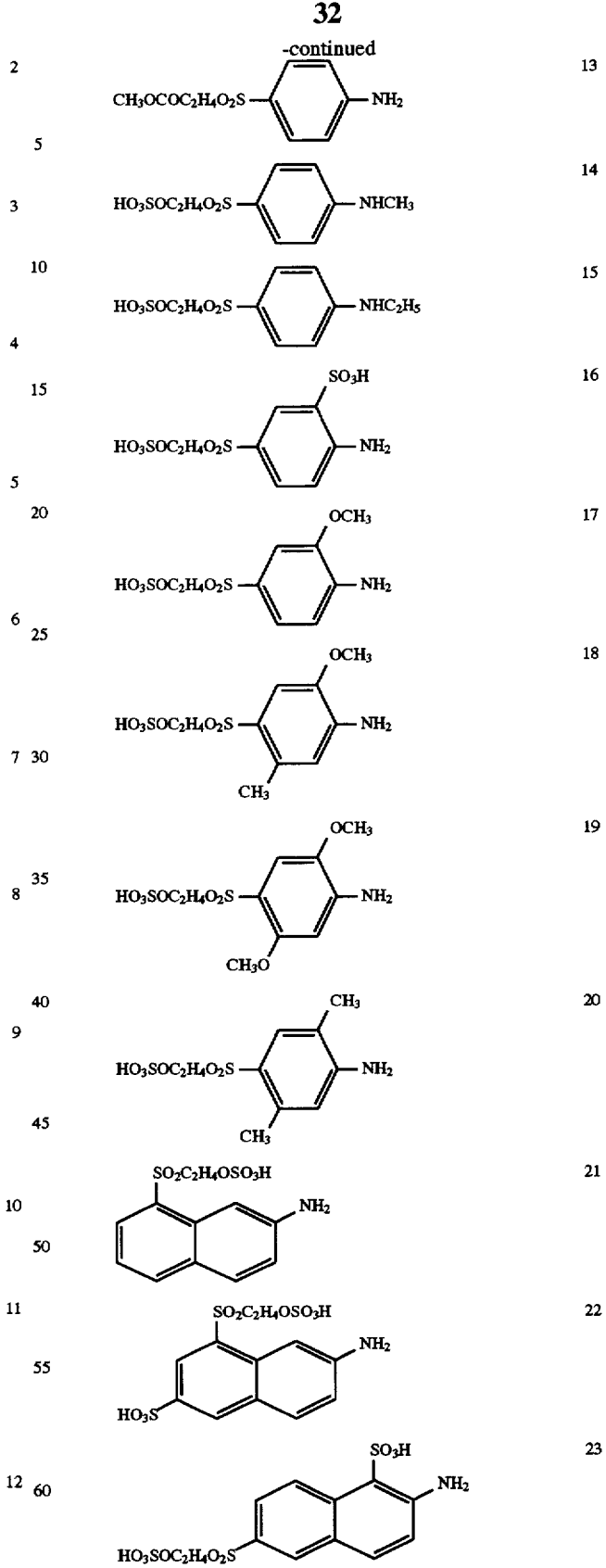
EXAMPLES 152–155
By conducting the same processes in Example 129 except that 2,4-diaminobenzene sulfonic acid used in the reaction with phthalocyanine blue is replaced with each of diaminobenzene derivatives No. 152–155 listed below, the corresponding phthalocyanine monoazo compound can be obtained. By conducting the dyeing by using them, dyed products having green color can be obtained.

152 2,5-diaminobenzene sulfonic acid
153 4,6-diaminobenzene 1,3-disulfonic acid
154 2-amino-4-(N-methylaminobenzene) sulfonic acid
155 2-amino-5-(N-methylaminobenzene) sulfonic acid

EXAMPLES 156–177

By conducting the same processes in Example 129 except that 1-aminobenzene-3-β-sulfatoethylsulfone used in the reaction with cyanuric chloride is replaced with each of aminobenzene compounds or aminonaphthalene derivatives No. 28–49 (The number plus 128 corresponds the Example number.) listed below, the corresponding phthalocyanine monoazo compound can be obtained. By conducting the dyeing by using them, dyed products having green color can be obtained.

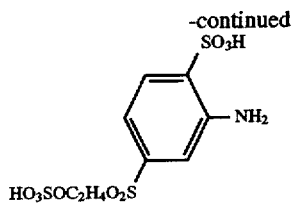

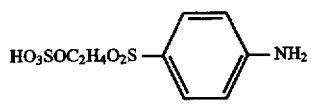

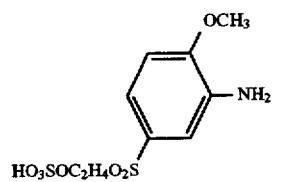

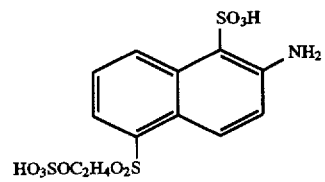

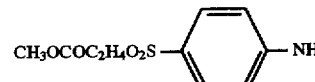

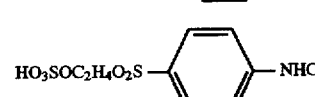

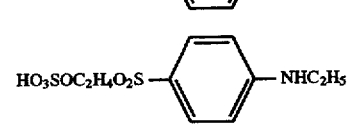

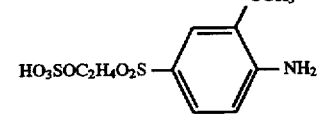

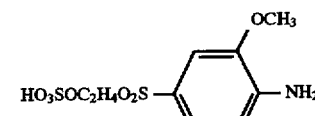

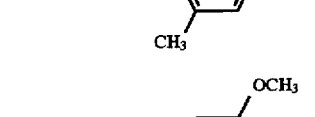

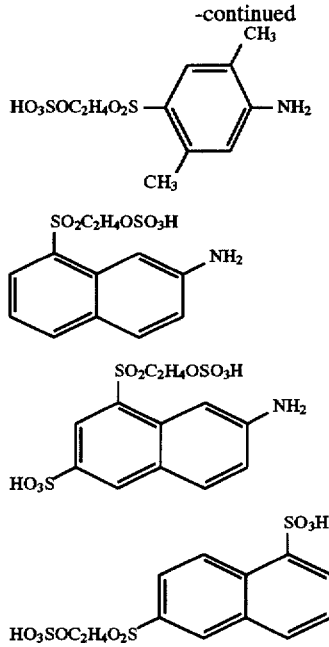

EXAMPLES 178–198

By conducting the same processes in Example 129 except that 2-amino-4-methoxy-5-(3'-oxobutyrylamino) benzene sulfonic acid is replaced with each of the compounds shown in the following Table 4, the corresponding phthalocyanine monoazo compound can be obtained. By conducting the dyeing by using them, dyed products having green color can be obtained. In the Table 4, "substitution position" means the substitution position of $R_5COCH_2CONH$— to $NHR_{10}$.

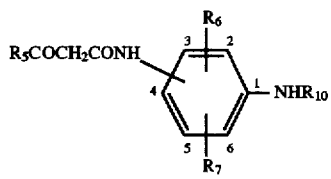

TABLE 4

| No. | $R_{10}$ | $R_6$ | $R_7$ | $R_5$ | Substitution Position |
|---|---|---|---|---|---|
| 178 | $CH_3$ | 2-$SO_3H$ | 5-$OCH_3$ | $C_2H_5$ | 4 |
| 179 | $C_2H_5$ | 2-$SO_3H$ | 5-$OCH_3$ | $C_2H_5$ | 4 |
| 180 | H | 2-$SO_3H$ | 5-$OC_2H_5$ | $CH_3$ | 4 |
| 181 | $C_2H_5$ | 2-$SO_3H$ | 5-$OC_2H_5$ | $CH_3$ | 4 |
| 182 | H | 2-$SO_3H$ | 5-$OC_2H_5$ | $C_2H_5$ | 4 |
| 183 | $CH_3$ | 2-$SO_3H$ | 5-$OCH_3$ | $CH_3$ | 4 |
| 184 | $C_2H_5$ | 2-$SO_3H$ | 5-$OCH_3$ | $CH_3$ | 4 |
| 185 | H | 2-$SO_3H$ | 5-$CH_3$ | $CH_3$ | 4 |
| 186 | H | 2-$SO_3H$ | 5-$C_2H_5$ | $CH_3$ | 4 |
| 187 | H | 2-$C_3H_7$ | 5-$OCH_3$ | $CH_3$ | 4 |
| 188 | H | 2-$C_2H_5$ | 5-$C_2H_5$ | $CH_3$ | 4 |
| 189 | H | 2-$OCH_3$ | 5-$OCH_3$ | $CH_3$ | 4 |
| 190 | $C_2H_5$ | H | 5-$OCH_3$ | $CH_3$ | 4 |
| 191 | H | 2-$SO_3H$ | H | $CH_3$ | 4 |
| 192 | H | H | 5-$CH_3$ | $CH_3$ | 4 |
| 193 | H | 2-$CH_3$ | H | $CH_3$ | 4 |
| 194 | H | 2-$OC_2H_5$ | H | $CH_3$ | 4 |
| 195 | H | H | H | $CH_3$ | 5 |
| 196 | H | H | H | $C_2H_5$ | 4 |
| 197 | H | 2-$CH_3$ | 6-$CH_3$ | $CH_3$ | 5 |
| 198 | H | 3-$OCH_3$ | 5-$OCH_3$ | $C_2H_5$ | 4 |

EXAMPLE 199

Example 129 was repeated except that the amount of 2,4-diaminobenzene sulfonic acid used in the reaction with the copper phthalocyanine sulfochloride slurry was increased to 19.2 parts, the amount of 1-aminobenzene-3-β-sulfatoethylsulfone used in the preparation of the condensate reaction solution was decreased to 22.4 parts, and the amounts of sodium nitrite, 35% hydrochloric acid, 2-amino-4-methoxy-5-(3'-oxobutyrylamino) benzene sulfonic acid, cyanuric chloride and 1-aminobenzene-3-β-sulfatoethyl sulfone used in the preparation of the phthalocyanine monoazo compound were increased to 8.3 parts, 25.2 parts, 36.2 parts, 22.1 parts and 37.2 parts, respectively, to obtain a compound having the same structure as that in Example 129 except that in the formula, p=0.8, q=2.2 and r=1.0.

0.3 Part of the phthalocyanine monoazo compound thus obtained was dissolved in 200 parts of water and 10 parts of sodium sulfonate was added thereto. To the resulting solution, 10 parts of cotton cloth was added and, then, after the temperature was raised to 60° C., it was stirred for 30 minutes. Thereafter, 4 parts of sodium carbonate was added thereto and dyeing was conducted at that temperature for 1 hour. After the completion of the dyeing, washing and soaping were carried out to obtain a dyed product excellent in various fastness which has green color but is more yellowish than the dyed product in Example 129.

EXAMPLE 200

By conducting the same processes in Example 129 except that cyanuric chloride (=2,4,6-trichloro-s-triazine) used in Example 1 is replaced with 2,4,6-trifluoro-s-triazine or with 2,4,6-tribromo-s-triazine, the corresponding phthalocyanine monoazo compound can be obtained.

EXAMPLE 201

To the final reaction solution obtained in Example 129, 31 parts of 1-aminobenzene-3-β-sulfatoethylsulfone was added and then the reaction was conducted at 65°–70° C. for 7–10 hours, while keeping the pH at 2.0–3.0. Thus, a phthalocyanine monoazo compound represented by the following formula:

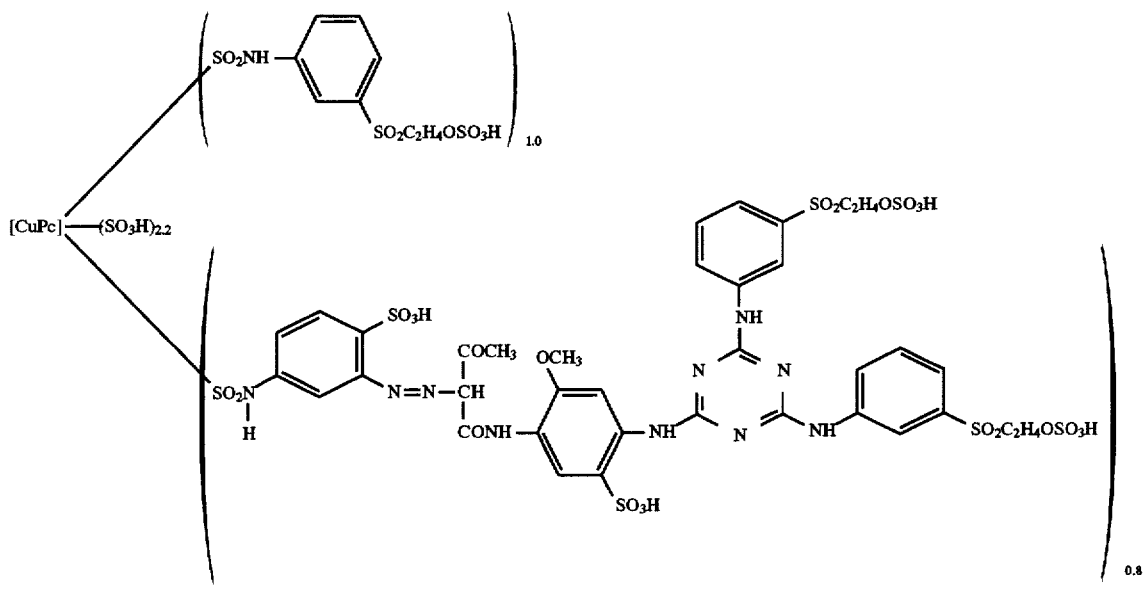

wherein Pc represents phthalocyanine group, and/or salt thereof was obtained.

λmax. : 674 nm 0.3 Part of the monoazo compound thus obtained was dissolved in 200 parts of water. Then 10 parts of sodium sulfate and 10 parts of a cotton cloth was added thereto and the bath temperature was raised to 60° C. After stirring it for 30 minutes, 4 parts of sodium carbonate was added thereto and dyeing was conducted at that temperature for one hour. After completion of the dyeing, washing and soaping were conducted to obtain a green dyed product which is excellent in various fastness and superior in build-up property to that obtained by using the compound described in Example 129.

EXAMPLES 202–251

By conducting the same processes in Example 201 except that 1-aminobenzene-3-β-sulfatoethylsulfone used in Example 201 is replaced with a compound represented by RNHR" wherein the meanings of R and R" are as described in Table 5, the corresponding phthalocyanine monoazo compound can be obtained and green dyed product can be obtained by conducting dyeing by using them.

TABLE 5

| | RNHR" | |
|---|---|---|
| No. | R | R" |
| 202 | $C_6H_5$ | H |
| 203 | $C_6H_4SO_3H$-2 | H |
| 204 | $C_6H_4SO_3H$-3 | H |
| 205 | $C_6H_4SO_3H$-4 | H |
| 206 | $C_6H_4CH_3$-4 | H |
| 207 | $C_6H_4C_2H_5$-2 | H |
| 208 | $C_6H_4C_3H_7$-3 | H |
| 209 | $C_6H_4OCH_3$-4 | H |
| 210 | $C_6H_4OCH_3$-2 | H |
| 211 | $C_6H_4OC_2H_5$-3 | H |
| 212 | $C_6H_3(SO_3H$-2$)CH_3$-4 | H |
| 213 | $C_6H_3(SO_3H$-2$)C_2H_5$-5 | H |

TABLE 5-continued

| | RNHR" | |
|---|---|---|
| No. | R | R" |
| 214 | $C_6H_3(SO_3H$-2$)OCH_3$-4 | H |
| 215 | $C_6H_3(SO_3H$-2$)OC_2H_5$-5 | H |
| 216 | $C_6H_3(SO_3H$-5$)CH_3$-2 | H |
| 217 | $C_6H_3(SO_3H$-5$)C_2H_5$-2 | H |
| 218 | $C_6H_3(SO_3H$-5$)OCH_3$-2 | H |
| 219 | $C_6H_3(SO_3H$-5$)OC_2H_5$-2 | H |
| 220 | $C_6H_3(SO_3H$-4$)OCH_3$-2 | H |
| 221 | $C_6H_3(SO_3H$-4$)OC_2H_5$-2 | H |
| 222 | $C_6H_4COOH$-2 | H |
| 223 | $C_6H_4COOH$-3 | H |
| 224 | $C_6H_4COOH$-4 | H |
| 225 | $C_6H_4Cl$-4 | H |
| 226 | $C_6H_4Cl$-3 | H |
| 227 | $C_6H_4Br$-2 | H |
| 228 | $C_6H_2(SO_3H$-4$)(OCH_3$-2$)CH_3$-5 | H |
| 229 | $C_6H_2(SO_3H$-4$)(OC_2H_5$-2$)CH_3$-5 | H |
| 230 | $C_6H_3(CH_3)_2$-2,5 | H |
| 231 | $C_6H_2(SO_3H$-4$)(CH_3)_2$-2,5 | H |
| 232 | $C_6H_3(OCH_3)_2$-2,5 | H |
| 233 | $C_6H_2(SO_3H$-4$)(OCH_3)_2$-2,5 | H |
| 234 | $C_6H_3(OCH_3$-2$)CH_3$-4 | H |
| 235 | $C_6H_4SO_2CH=CH_2$-3 | H |
| 236 | $C_6H_3(SO_2C_2H_4OSO_3H$-3$)OCH_3$-4 | H |
| 237 | $C_6H_3(SO_2C_2H_4OSO_3H$-3$)SO_3H$-2 | H |
| 238 | $C_6H_4SO_2C_2H_4OSO_3H$-4 | H |
| 239 | $C_6H_4SO_2C_2H_4OCOCH_3$-4 | H |
| 240 | $C_6H_3(SO_2C_2H_4OSO_3H$-4$)SO_3H$-2 | H |
| 241 | $C_6H_3(SO_2C_2H_4OSO_3H$-4$)OCH_3$-2 | H |
| 242 | $C_6H_2(SO_2C_2H_4OSO_3H$-4$)(OCH_3$-2$)CH_3$-5 | H |
| 243 | $C_6H_2(SO_2C_2H_4OSO_3H$-4$)(CH_3)_2$-2,5 | H |
| 244 | $C_6H_2(SO_2C_2H_4OSO_3H$-4$)(OCH_3)_2$-2,5 | H |
| 245 | $C_6H_4SO_2C_2H_4OSO_3H$-3 | $C_2H_5$ |
| 246 | $C_6H_4SO_2C_2H_4Cl$ | $CH_3$ |
| 247 | $C_6H_4SO_2C_2H_4OSO_3H$-4 | $C_2H_5$ |
| 248 | $HOOCCH_2$ | H |
| 249 | $CH_3$ | H |
| 250 | $C_2H_5$ | H |
| 251 | $C_4H_9$ | H |

EXAMPLES 252–254

By conducting the same processes in Example 201 except that 1-aminobenzene-3-β-sulfatoethylsulfone used in Example 201 is replaced with a compound represented by ROH wherein the meanings of R are as described in Table 6, the corresponding phthalocyanine monoazo compound can be obtained and green dyed product can be obtained by conducting dyeing by using them.

EXAMPLE 255

0.3 Part of each of the monoazo compounds obtained in Example 129, 199 and 201 was dissolved in 200 parts of water. Then 10 parts of sodium sulfate and 10 parts of a cotton cloth was added thereto and the bath temperature was raised to 70°–90° C. After stirring it for 30 minutes, 4 parts of sodium carbonate was added thereto and dyeing was conducted at that temperature for one hour. After completion of the dyeing, washing and soaping were conducted to obtain a green dyed product which is excellent in various fastness and good in build-up property.

EXAMPLES 256

By conducting the same processes in Example 129–254 except that the copper phthalocyanine blue was replaced with nickel phthalocyanine blue, the corresponding nickel phthalocyanine monoazo compound can be obtained.

EXAMPLE 257

Preparation of the condensate reaction solution in Example 1 was repeated to obtain about 900 parts of condensate reaction solution.

To the condensate reaction solution thus obtained, 6.9 parts of sodium nitrite was added, and the resulting solution was added dropwise to a mixture of 21 parts of 35% hydrochloric acid and 200 parts of water at 10°–15° C. to conduct a diazotization. To the diazotized reaction product thus obtained, a reaction solution prepared by charging 28.2 parts of 1-[4-(β-hydroxyethyl) sulfonylphenyl]-3-methyl-5-pyrazolone to 40 parts of 15% fuming sulfuric acid at 50°–60° C. and conducting an esterification was added and, then, pH of the solution was adjusted to 6.0 with the aid of aqueous sodium carbonate solution to conduct a coupling reaction. The reaction mass thus obtained was dried to obtain 300 parts of a phthalocyanine monoazo compound represented by the following formula:

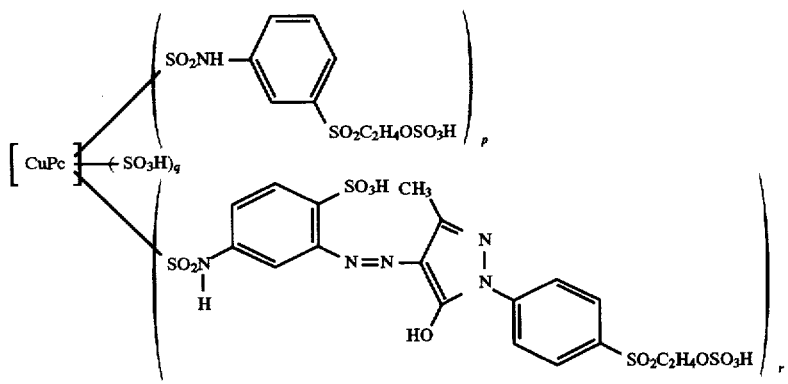

wherein Pc represents a phthalocyanine group, $p=1.0$, $q=2.2$ and $r=0.8$, and/or a salt thereof.

$\lambda_{max}$ ; 674 nm 0.3 Part of the phthalocyanine monoazo compound thus obtained was dissolved in 200 parts of water and 10 parts of sodium sulfonate was added thereto. To the resulting solution, 10 parts of cotton cloth was added and, then, after the temperature was raised to 60° C., it was stirred for 30 minutes. Thereafter, 4 parts of sodium carbonate was added thereto and dyeing was conducted at that temperature for 1 hour. After the completion of the dyeing, washing and soaping were carried out to obtain a green dyed product excellent in various fastness. The phthalocyanine monoazo compound exhibited good dyeing reproducibility.

EXAMPLES 258–279

By conducting the same processes in Example 257 except that 1-aminobenzene-3-β-sulfatoethylsulfone used in the reaction with phthalocyanine is replaced with each of aminobenzene compounds or aminonaphthalene derivatives shown and numbered 2–23. (The number plus 256 corresponds the Example number.) in the following list, the corresponding phthalocyanine monoazo compound can be obtained. By conducting the dyeing by using them, dyed products having green color can be obtained.

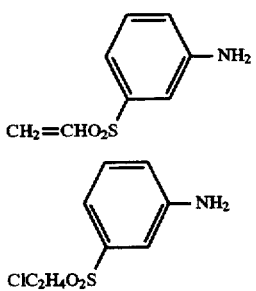

TABLE 6

| ROH | |
|---|---|
| No. | R |
| 252 | CH$_3$ |
| 253 | C$_2$H$_5$ |
| 254 | C$_3$H$_7$ |

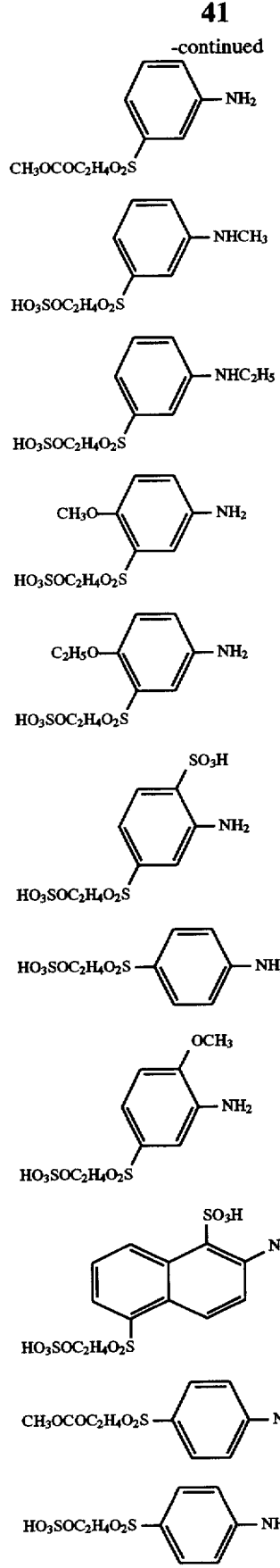
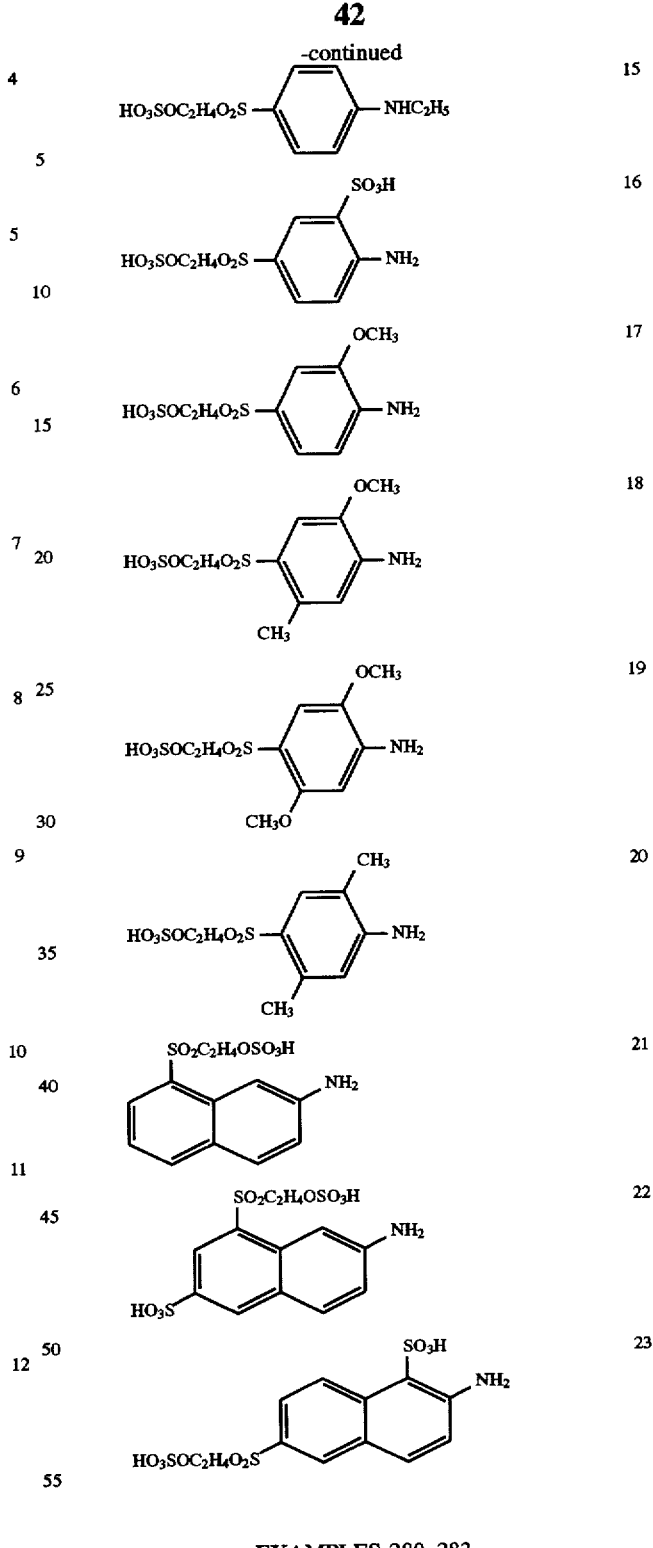

EXAMPLES 280–283

By conducting the same processes in Example 257 except that 2,4-diaminobenzene sulfonic acid used in the reaction with phthalocyanine blue is replaced with each of diaminobenzene derivatives No. 280–283 listed below, the corresponding phthalocyanine monoazo compound can be obtained. By conducting the dyeing by using them, dyed products having green color can be obtained.

| | |
|---|---|
| 280 | 2,5-diaminobenzene sulfonic acid |
| 281 | 4,6-diaminobenzene 1,3-disulfonic acid |
| 282 | 2-amino-4-(N-methylaminobenzene) sulfonic acid |
| 283 | 2-amino-5-(N-methylaminobenzene) sulfonic acid |

EXAMPLES 284-301

By conducting the same processes in Example 257 except that the ester compound produced from 28.2 parts of 1-[4-(β-hydroxyethyl) sulfonylphenyl]-3-methyl-5-pyrazolone and 40 parts of fuming sulfuric acid used in Example 257 is replaced with 28.2 parts of each of pyrazolone derivatives No. 284-301 listed below, the corresponding phthalocyanine monoazo compound can be obtained. By conducting the dyeing by using them, dyed products having green color can be obtained.

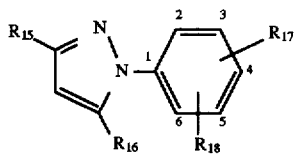

TABLE 7

| No. | $R_{15}$ | $R_{16}$ | $R_{17}$ | $R_{18}$ |
|---|---|---|---|---|
| 284 | H | OH | H | 3-SO$_3$H |
| 285 | CH$_3$ | OH | H | 4-SO$_3$H |
| 286 | COOH | OH | H | 4-SO$_3$H |
| 287 | COOCH$_3$ | OH | H | 4-SO$_3$H |
| 288 | CH$_3$ | OH | H | 3-SO$_3$H |
| 289 | COOH | OH | H | 3-SO$_3$H |
| 290 | CH$_3$ | OH | 4-Cl | 3-SO$_3$H |
| 291 | CH$_3$ | OH | 2-CH$_3$ | 4-SO$_3$H |
| 292 | CH$_3$ | OH | 2-OCH$_3$ | 4-SO$_3$H |
| 293 | CH$_3$ | OH | H | 4-COOH |
| 294 | COOCH$_3$ | OH | H | 3-SO$_3$H |
| 295 | COOH | OH | 2-CH$_3$ | 4-SO$_3$H |
| 296 | COOH | OH | 3-Cl | 4-SO$_3$H |
| 297 | CH$_3$ | OH | H | 3-NHCOCH$_3$ |
| 298 | COOH | OH | H | 4-NHCOC$_2$H$_5$ |
| 299 | CH$_3$ | OH | 4-CH$_3$ | 2-SO$_3$H |
| 300 | CH$_3$ | NH$_2$ | H | 4-SO$_3$H |
| 301 | CH$_3$ | NH$_2$ | H | 3-SO$_3$H |

EXAMPLES 302-317

By conducting the same processes in Example 257 except that the ester compound produced from 28.2 parts of 1-[4-(β-hydroxyethyl) sulfonylphenyl]-3-methyl-5-pyrazolone and 40 parts of fuming sulfuric acid used in Example 257 is replaced with 28.2 parts of each of pyrazolone derivatives No. 302-317 listed below, the corresponding phthalocyanine monoazo compound can be obtained. By conducting the dyeing by using them, dyed products having green color can be obtained.

TABLE 8

| No. | $R_{15}$ | $R_{16}$ | $R_{17}$ | $R_{18}$ |
|---|---|---|---|---|
| 302 | CH$_3$ | OH | H | 3-SO$_2$C$_2$H$_4$OSO$_3$H |
| 303 | CH$_3$ | OH | 2-SO$_3$H | 4-SO$_2$C$_2$H$_4$OSO$_3$H |
| 304 | CH$_3$ | OH | 2-OCH$_3$ | 4-SO$_2$C$_2$H$_4$OSO$_3$H |
| 305 | COOH | OH | H | 4-SO$_2$C$_2$H$_4$OSO$_3$H |

TABLE 8-continued

| No. | $R_{15}$ | $R_{16}$ | $R_{17}$ | $R_{18}$ |
|---|---|---|---|---|
| 306 | COOCH$_3$ | OH | H | 4-SO$_2$C$_2$H$_4$OSO$_3$H |
| 307 | COOH | OH | 2-SO$_3$H | 4-SO$_2$C$_2$H$_4$OSO$_3$H |
| 308 | COOH | OH | H | 3-SO$_2$C$_2$H$_4$OSO$_3$H |
| 309 | COOH | OH | 2-OCH$_3$ | 4-SO$_2$C$_2$H$_4$OSO$_3$H |
| 310 | COOCH$_3$ | OH | 2-OCH$_3$ | 4-SO$_2$C$_2$H$_4$OSO$_3$H |
| 311 | COOCH$_3$ | OH | H | 3-SO$_2$C$_2$H$_4$OSO$_3$H |
| 312 | CH$_3$ | OH | 2-OCH$_3$ | 5-SO$_2$C$_2$H$_4$OSO$_3$H |
| 313 | COOH | OH | 2-OCH$_3$ | 5-SO$_2$C$_2$H$_4$OSO$_3$H |
| 314 | COOCH$_3$ | OH | 2-OCH$_3$ | 5-SO$_2$C$_2$H$_4$OSO$_3$H |
| 315 | CH$_3$ | NH$_2$ | H | 4-SO$_2$C$_2$H$_4$OSO$_3$H |
| 316 | CH$_3$ | NH$_2$ | H | 3-SO$_2$C$_2$H$_4$OSO$_3$H |
| 317 | CH$_3$ | NH$_2$ | 2-OCH$_3$ | 5-SO$_2$C$_2$H$_4$OSO$_3$H |

EXAMPLE 318

Example 257 was repeated except that the amount of 2,4-diaminobenzene sulfonic acid used in the reaction with the copper phthalocyanine sulfochloride slurry was increased to 19.2 parts, the amount of 1-aminobenzene-3-β-sulfatoethylsulfone used in the preparation of the condensate reaction solution was decreased to 22.4 parts, and the amounts of sodium nitrite, 35% hydrochloric acid, 1-[4-(β-hydroxyethyl) sulfonylphenyl]-3-methyl-5-pyrazolone used in the preparation of the phthalocyanine monoazo compound were increased to 8.3 parts, 25.2 parts and 34.0 parts, respectively, to obtain a compound having the same structure as that in Example 257 except that in the formula, p=0.8, q=2.2 and r=1.0.

0.3 Part of the phthalocyanine monoazo compound thus obtained was dissolved in 200 parts of water and 10 parts of sodium sulfonate was added thereto. To the resulting solution, 10 parts of cotton cloth was added and, then, after the temperature was raised to 60° C., it was stirred for 30 minutes. Thereafter, 4 parts of sodium carbonate was added thereto and dyeing was conducted at that temperature for 1 hour. After the completion of the dyeing, washing and soaping were carried out to obtain a dyed product excellent in various fastness which has green color but is more yellowish than the dyed product in Example 257.

EXAMPLE 319

0.3 Part of each of the monoazo compounds obtained in Example 257 and 318 was dissolved in 200 parts of water. Then 10 parts of sodium sulfate and 10 parts of a cotton cloth was added thereto and the bath temperature was raised to 70°-90° C. After stirring it for 30 minutes, 4 parts of sodium carbonate was added thereto and dyeing was conducted at that temperature for one hour. After completion of the dyeing, washing and soaping were conducted to obtain a green dyed product which is excellent in various fastness and good in build-up property.

EXAMPLE 320

By conducting the same processes in Example 257-318 except that the copper phthalocyanine blue was replaced with nickel phthalocyanine blue, the corresponding nickel phthalocyanine monoazo compound can be obtained.

The compound of the present invention exhibits good evenness and reproducibility of dyeing as a hydroxy- or nitrogen-containing organic substrate and has good dyeing property such as build-up property, temperature sensitivity, salt sensitivity, alkali sensitivity and bath-ratio dependency and is good in various fastness.

What we claim is:

1. A phthalocyanine monoazo derivative represented by the formula (I):

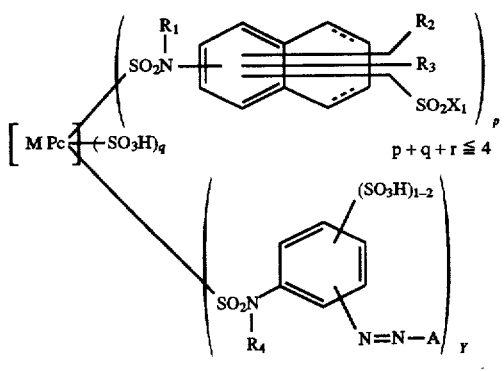

wherein Pc represents a phthalocyanine group; M represents nickel, cobalt or copper; $R_1$ represents a hydrogen atom or an unsubstituted or substituted lower alkyl group;

$R_2$ and $R_3$ are the same or different and represent a hydrogen atom, an unsubstituted or substituted lower alkyl group, a lower alkoxy group or a sulfo group;

$R_4$ represents a hydrogen atom, or an unsubstituted or substituted lower alkyl group;

A represents —B—C in which B is a group represented by the following formula:

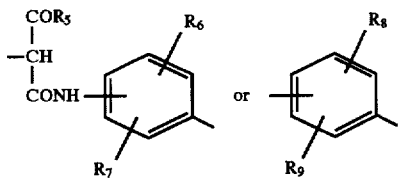

in which $R_5$ represents an unsubstituted or substituted lower alkyl group, $R_6$ and $R_7$ are the same or different and represent a hydrogen atom, an unsubstituted or substituted lower alkyl group, a lower alkoxy group or a sulfo group, and $R_8$ and $R_9$ are the same or different and represent a hydrogen atom, an unsubstituted or substituted lower alkyl group, a lower alkoxy group, a sulfo group, a lower alkylsulfonyl group, hydroxyacetyl amino group, an unsubstituted or substituted lower alkyl group or a group —NHCOR in which R represents a lower alkyl group, a lower alkoxy group, a phenyl group or a group —NR'R" in which R' and R" are the same or different and represent a hydrogen atom, an unsubstituted or substituted lower alkyl group, and C is a group represented by the following group:

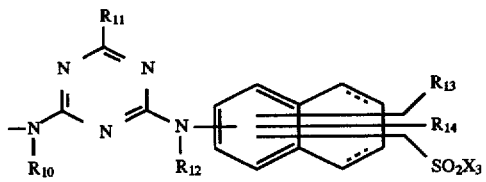

wherein $R_{10}$ and $R_{12}$ are the same or different and represent a hydrogen atom or an unsubstituted or substituted lower alkyl group, $R_{11}$ represents a chlorine atom, a fluorine atom, a bromine atom, a lower alkoxy group, an unsubstituted or substituted lower alkylamino group, a saturated nitrogen-containing hetrocyclic group attached to the triazine nucleus via nitrogen or a phenylamino group which is unsubstituted or substituted by 1–3 groups or atoms selected from an unsubstituted or substituted lower alkyl group, a lower alkoxy group, a chlorine atom, a fluorine atom, a bromine atom, —COOH, —$SO_3H$ or —$SO_2X_2$ group on the phenyl ring and in which the nitrogen atom of the amino group may be substituted by a substituted or unsubstituted lower alkyl group;

$R_{13}$ and $R_{14}$ are the same or different and represent a hydrogen atom, an unsubstituted or substituted lower alkyl group, a lower alkoxy group or a sulfo group;

or A is a group represented by the following formula:

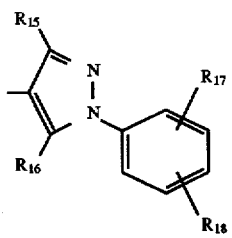

in which $R_{15}$ represents a hydrogen atom, a lower alkyl group, a carboxyl group or a lower alkoxycarbonyl group, $R_{16}$ represents a hydroxy group or a group —$NH_2$ $R_{17}$ and $R_{18}$ are the same or different and represent a hydrogen atom, a lower alkoxy group, a sulfo group, a fluorine atom, a chlorine atom, a fluorine atom, an acetylamino group, a propionylamino group, a carboxyl group, a group —$SO_2X_4$ or an unsubstituted or substituted lower alkyl group;

$X_1$, $X_2$, $X_3$ and $X_4$ are the same or different and represent —CH=$CH_2$ or —$CH_2CH_2Y$ in which Y represents a group removable by the action of an alkali;

p is from 0 to 2; q is from 1 to 3; r is from 0.5 to 2; and p+q+r is 4 or less;

provided that when p is 0, $R_{11}$ is a chlorine atom, a fluorine atom, a bromine atom or a phenylamino group substituted by at least one group $SO_2X_2$;

or a salt thereof.

2. A compound according to claim 1 wherein M is copper or nickel.

3. A compound according to claim 1 wherein p is not 0.

* * * * *